INVENTORS
W. C. WHITTUM AND
W. R. MILLER
BY
ATTORNEY

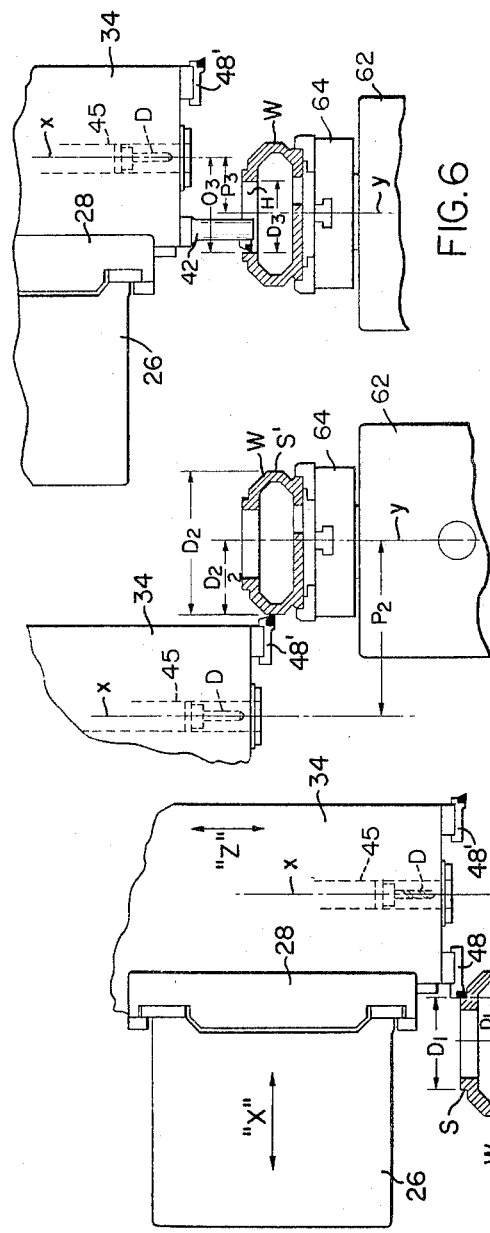
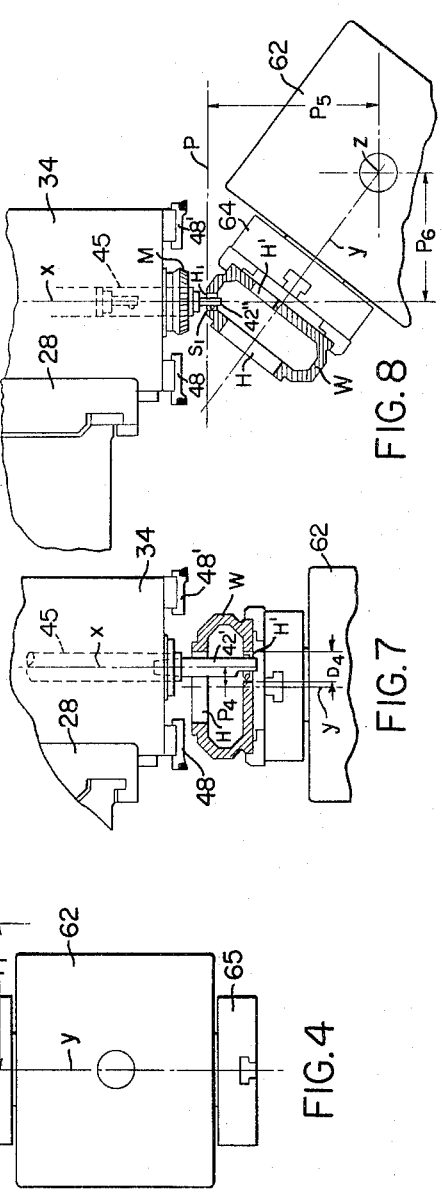
INVENTORS
W. C. WHITTUM AND
W. R. MILLER
BY
ATTORNEY

Aug. 23, 1966   W. C. WHITTUM ET AL   3,267,550
MACHINE TOOL

Filed Dec. 2, 1963   14 Sheets-Sheet 5

INVENTORS
W. C. WHITTUM AND
W. R. MILLER
BY
ATTORNEY

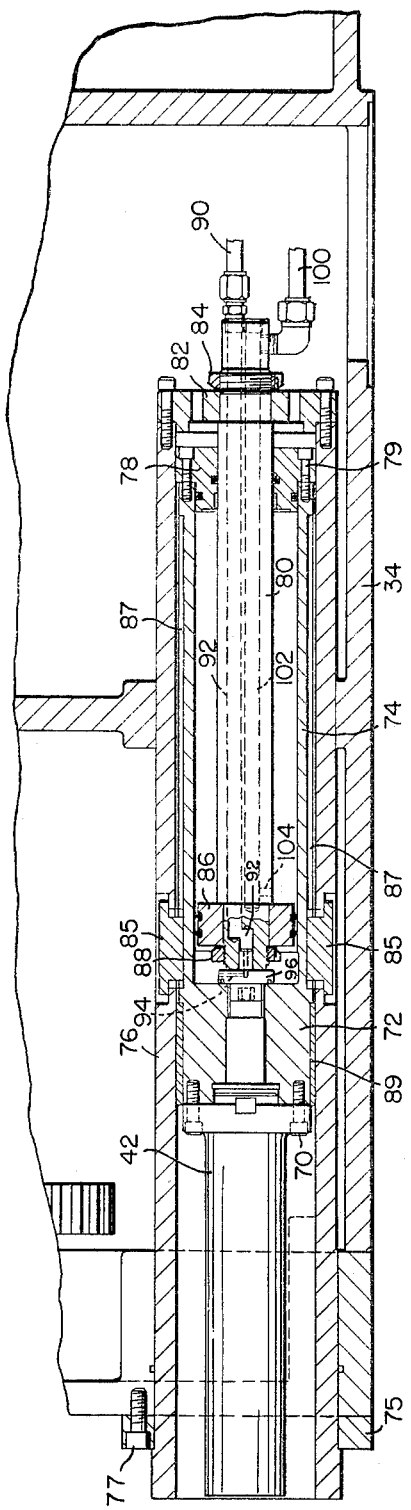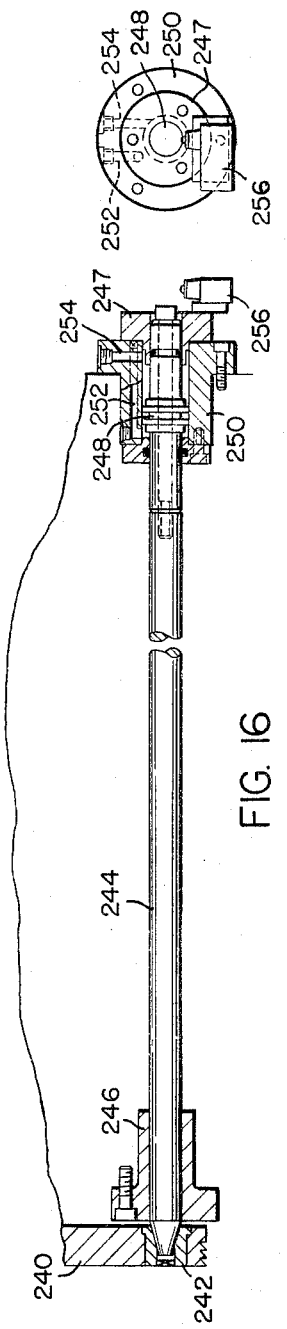

Aug. 23, 1966     W. C. WHITTUM ET AL     3,267,550
MACHINE TOOL
Filed Dec. 2, 1963                    14 Sheets-Sheet 8

INVENTORS
W. C. WHITTUM AND
W. R. MILLER
BY
ATTORNEY

INVENTORS
W. C. WHITTUM AND
W. R. MILLER

BY

ATTORNEY

United States Patent Office 3,267,550
Patented August 23, 1966

3,267,550
MACHINE TOOL
Warren C. Whittum, Orange, Conn., and William R. Miller, Rochester, N.Y., assignors to Farrel Corporation, Rochester, N.Y., a corporation of Connecticut
Filed Dec. 2, 1963, Ser. No. 327,281
20 Claims. (Cl. 29—27)

The present invention relates to machine tools, and particularly to machine tools for operating on large-sized workpieces.

Ordinarily large-sized machine tools are built for performing a single operation, such as milling, or boring, or drilling, or facing, or turning. This makes the machining of a large workpiece, which has to be milled, drilled, bored, faced, and/or turned, an expensive operation. Not only have costly machines to be provided for performing these several separate operations; but the workpiece has to be transferred from one machine to another after each operation thereon is completed; and this takes time, not only for transfer, but for dechucking and chucking again. Moreover, large-sized workpieces are awkward to handle and to chuck. Furthermore, since ordinarily the quantity of large-sized workpieces, which are to be machined at any time, is small, it means a heavy investment in very expensive machinery that ordinarily stands idle for much of the time.

A primary object of the present invention is to provide a machine for handling large-sized workpieces on which milling, turning, facing, drilling, and boring operations all can be performed without any need for transferring the workpiece from one machine to another.

Another object of the invention is to provide a machine of the character described on which different turning and boring operations can be performed by tools quickly movable into and out of operative position.

Another object of the invention is to provide a machine on which milling, turning, facing, drilling, and boring operations can all be performed and in which the tools or the supports therefor are quickly movable into and out of operative position.

Another object of the invention is to provide a machine tool of the character described whose operations can be performed successively and automatically under control of a tape, punch card or like means.

Another object of the invention is to provide a machine capable of performing boring and turning operations on a workpiece which is held in a rotary chuck which is rotated relative to a stationary boring or turning tool.

Still another object of the invention is to provide a machine tool on which the work can be rotated and the tool held stationary, or the tool can be rotated while the work is held stationary, as desired, and in accordance with the character of operation to be performed on the work.

A still further object of the invention is to provide a machine tool for boring or turning operations, in which the rotary chuck for the workpiece can be adjusted at various angles to the tool head for different turning and boring operations.

Other objects of the invention will be apparent hereinafter from the specification and from the recital of the appended claims particularly when read in conjunction with the accompanying drawings.

Figure 10:
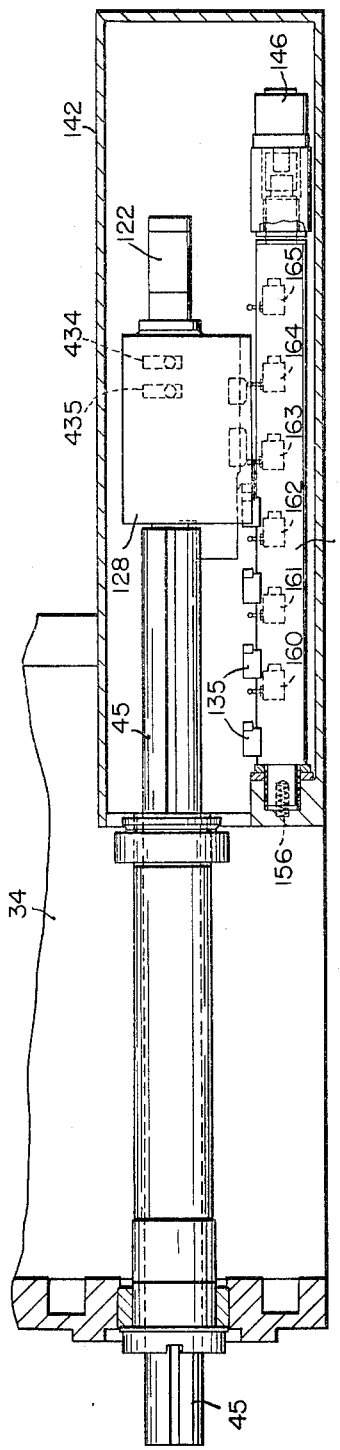
Figure 9:
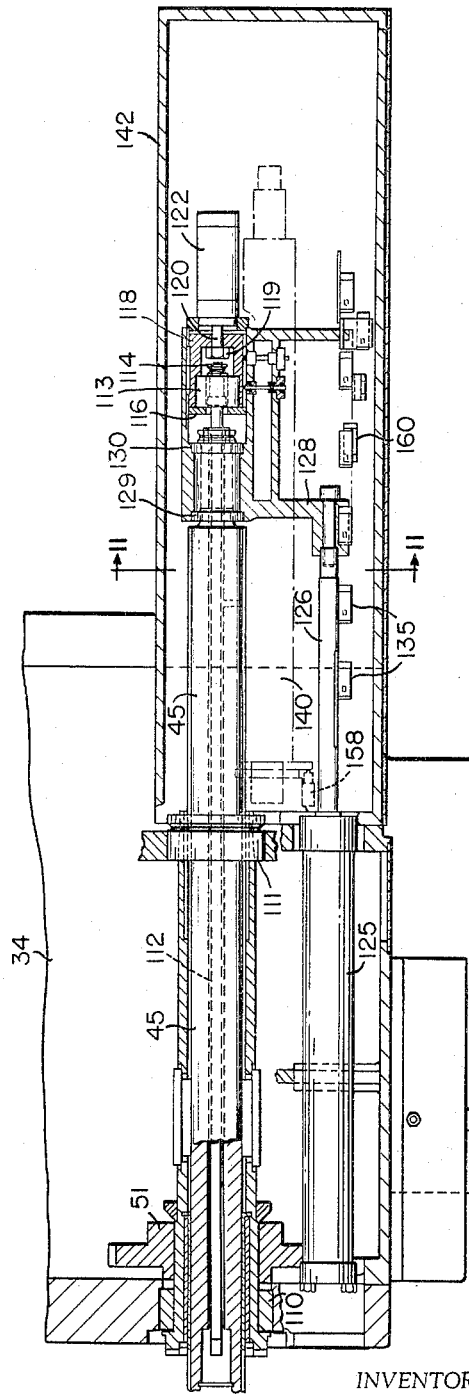
Figure 11:
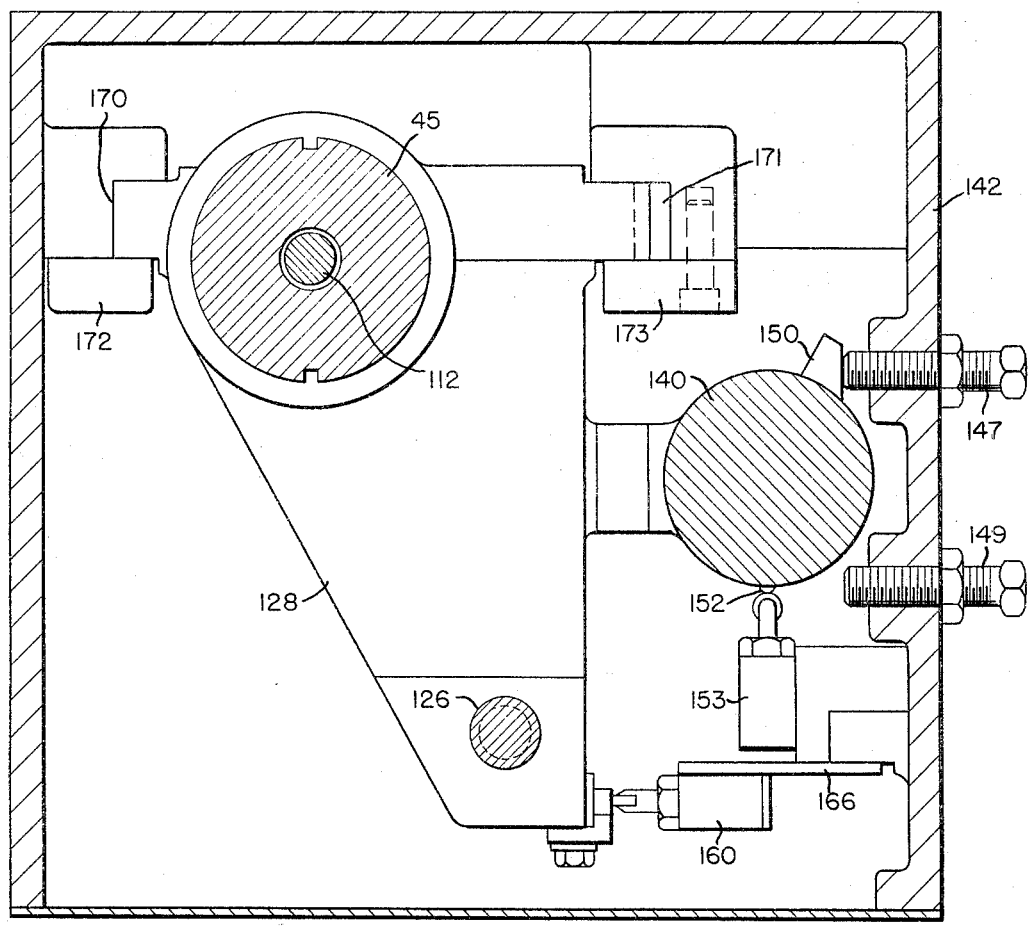
Figure 13:
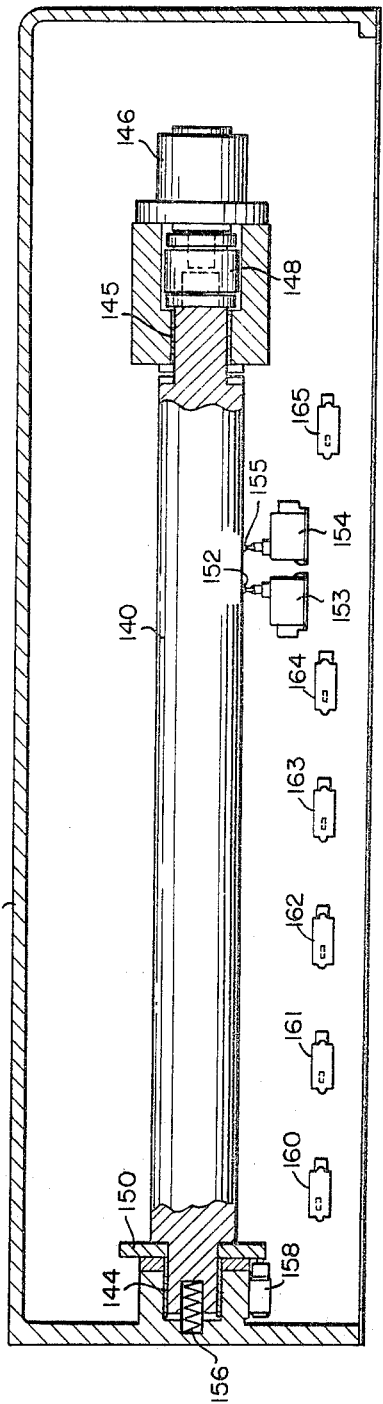
Figure 20:
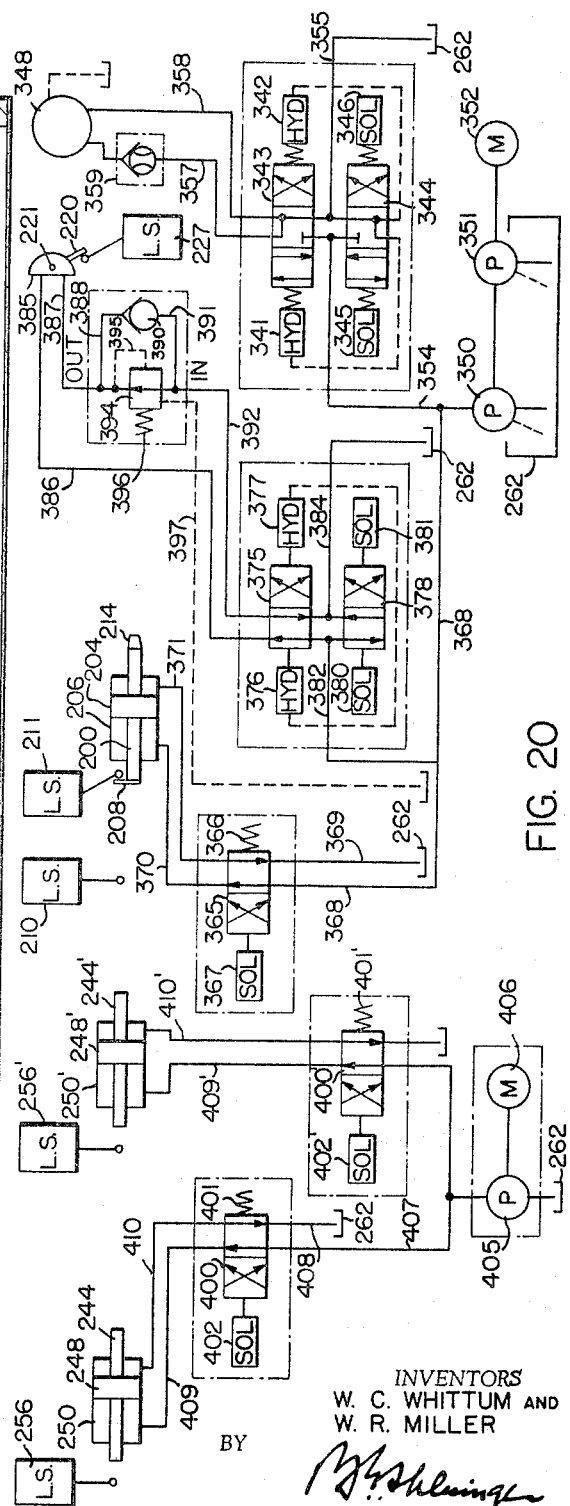
Figure 14:
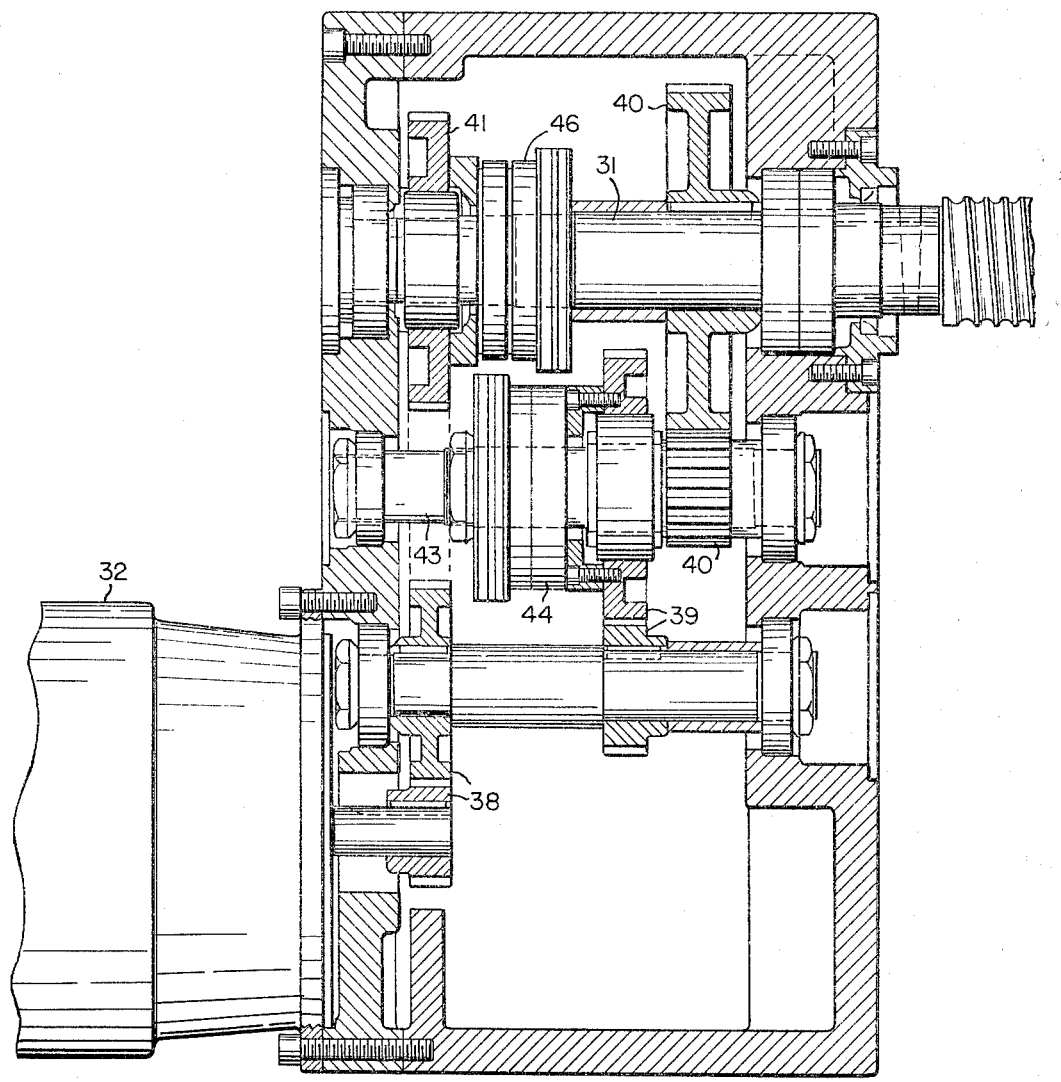
Figure 15:
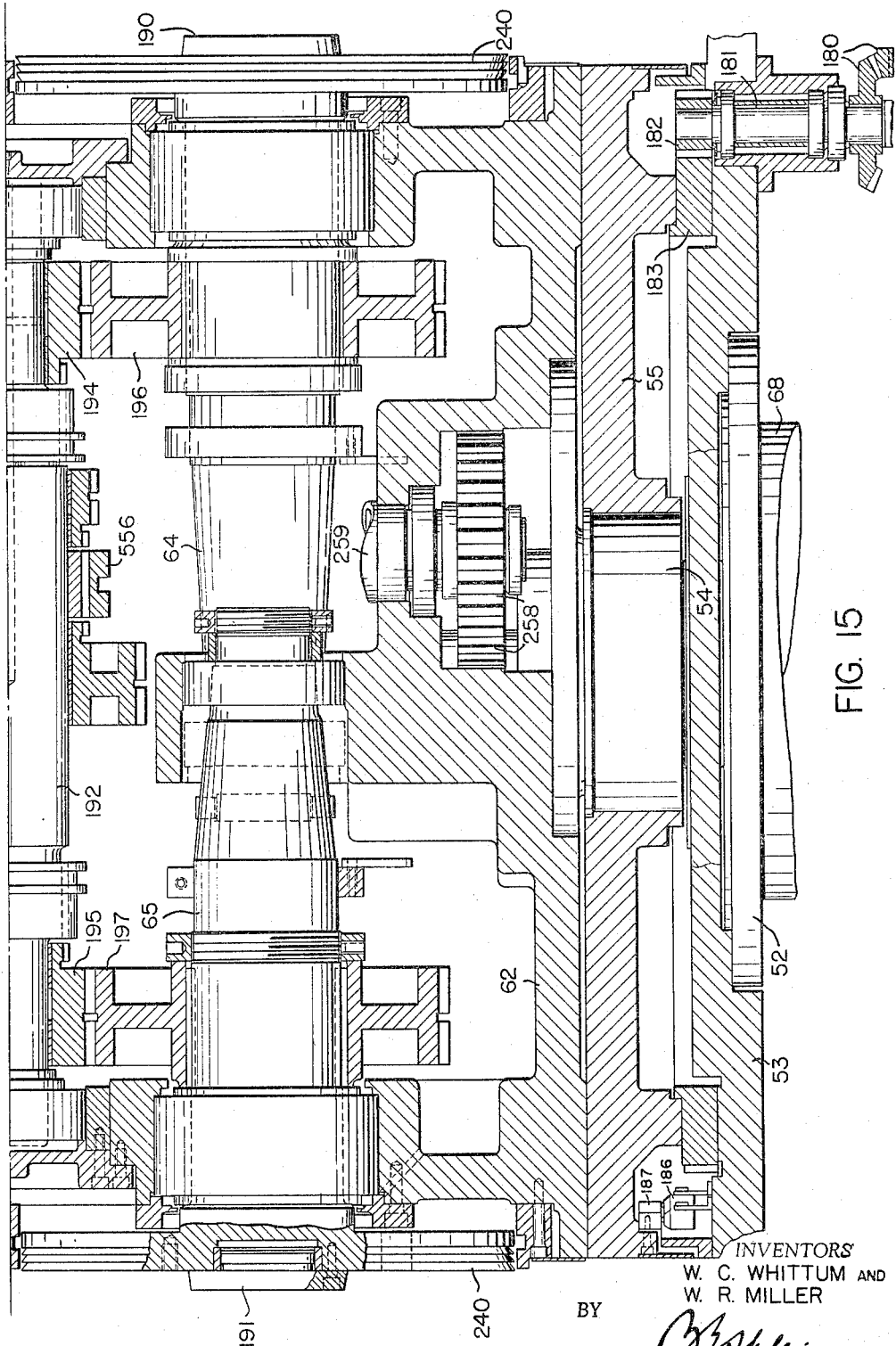
Figure 19:
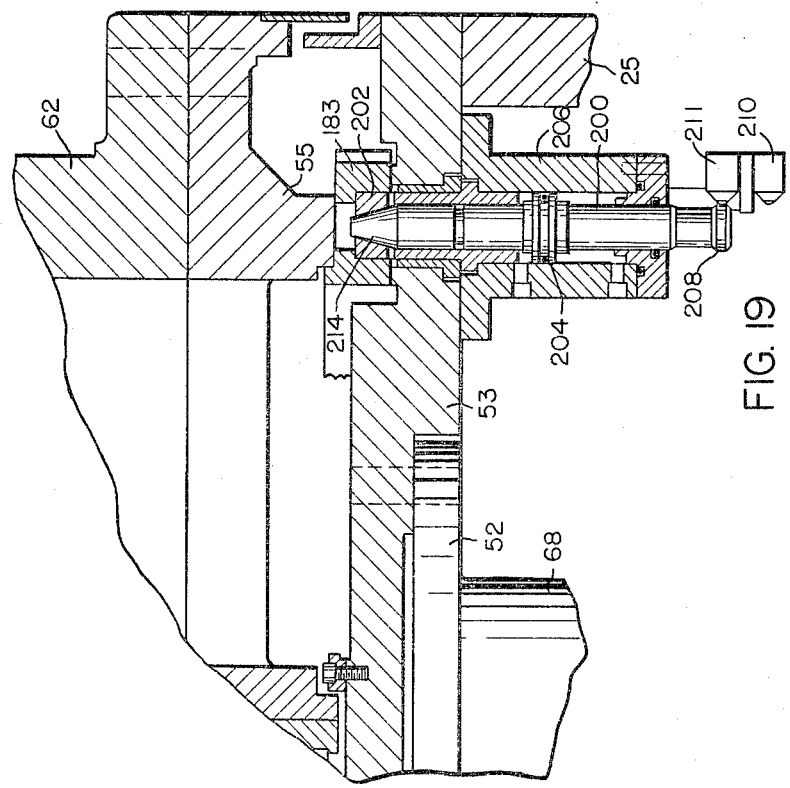
Figure 18:
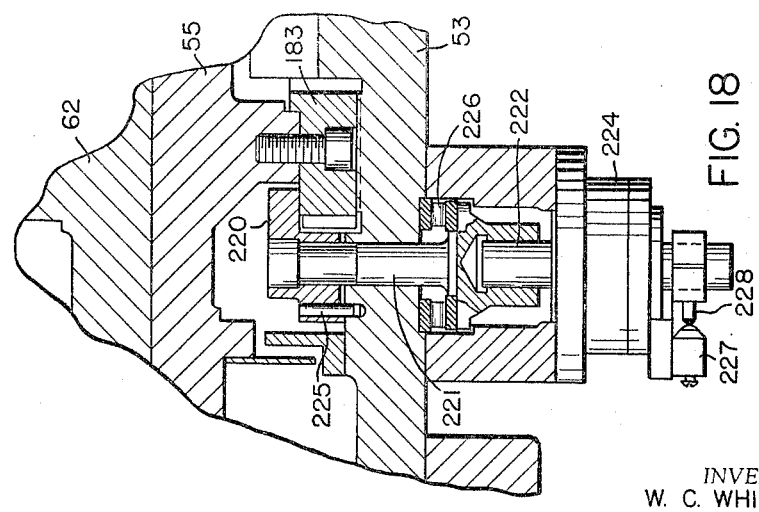
Figure 21:
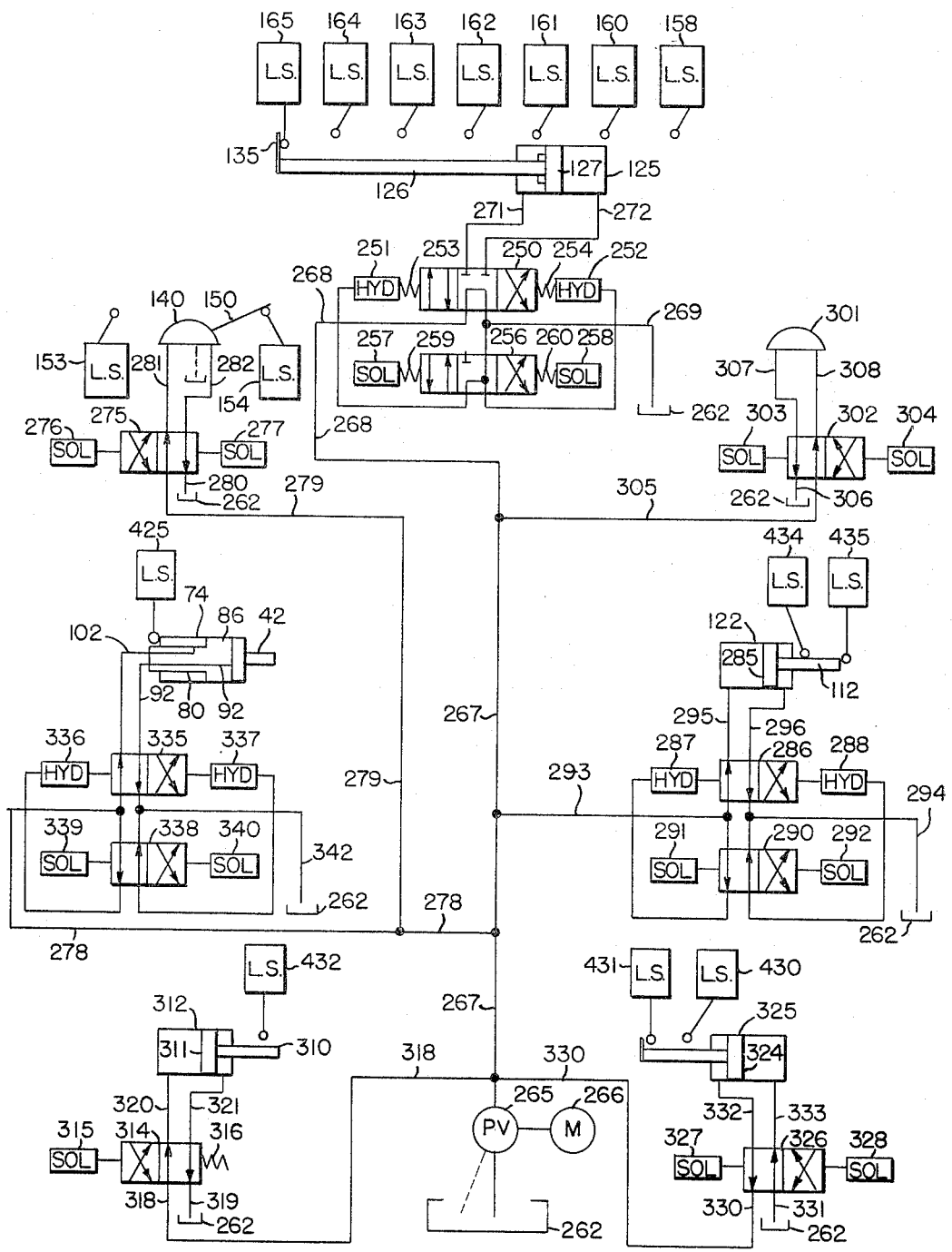
Figure 22A:
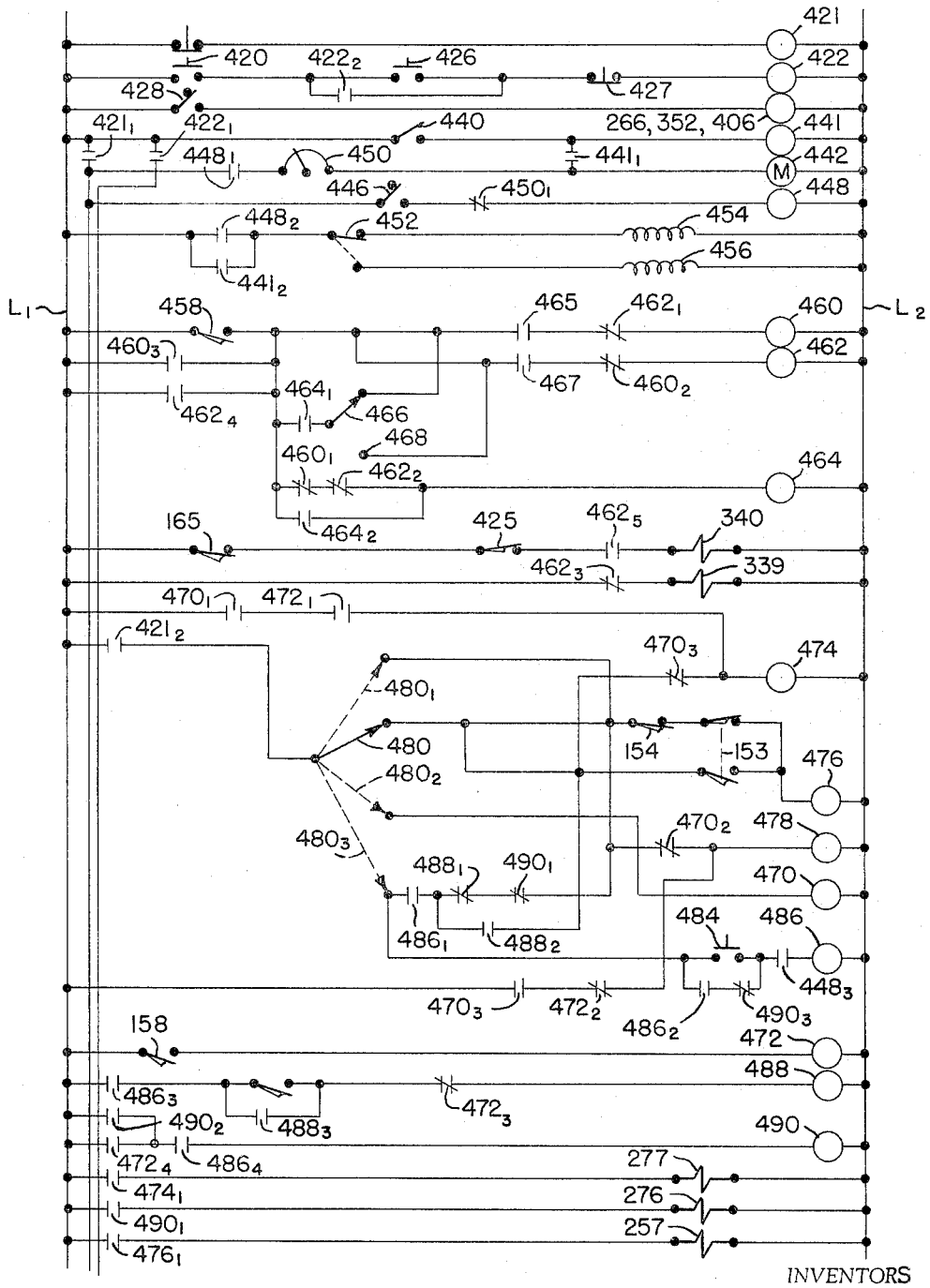
Figure 22B:
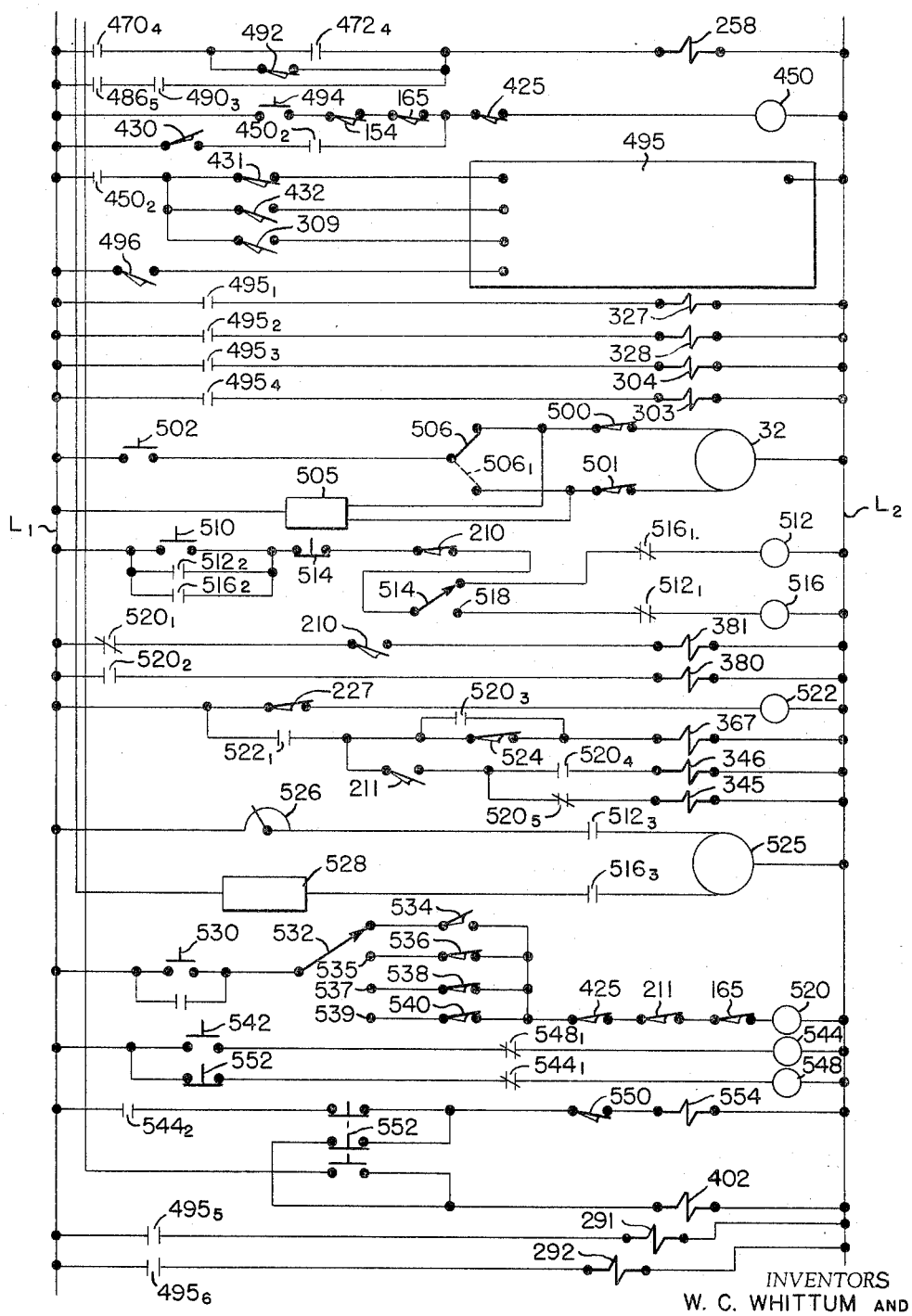

FIGS. 4 to 8 inclusive are more or less diagrammatic views illustrating various machining operations that may be performed by this machine;

FIG. 9 is a fragmentary vertical section through the tool head of the machine;

FIG. 10 is a section through the tool head taken at right angles to the view of FIG. 9;

FIG. 11 is a section on the line 11—11 of FIG. 9 on an enlarged scale and looking in the direction of the arrows, and showing the cross head in which the tool spindle is journaled and the tool spindle positioning bar;

FIG. 12 is a fragmentary vertical sectional view showing one of the boring bars and the hydraulic positioning means therefor;

FIG. 13 is a fragmentary section through the tool head further showing the tool spindle positioning bar;

FIG. 14 is a fragmentary sectional view showing a part of the mechanism for making one of the adjustments of the tool;

FIG. 15 is a fragmentary section through the work head of the machine;

FIG. 16 is a fragmentary sectional view showing the lock-up mechanism for holding the work head chuck in indexed position and the limit switch associated therewith;

FIG. 17 is a right-hand end view of this mechanism and of the limit switch;

FIG. 18 is a fragmentary sectional view showing the clamping mechanism for the work head;

FIG. 19 is a fragmentary sectional view showing the index lock-up dog for the work head and parts cooperating therewith;

FIG. 20 is a fragmentary hydraulic diagram illustrating the controls and means for operating the work head clamps and the index pins of the work spindles of the machine;

FIG. 21 is a hydraulic diagram illustrating the controls and means for effecting adjustment of the axial position of the tool spindle, the popout boring bars, the draw bolt, and the tool position stops of the machine; and FIGS. 22a and 22b together constitute an electrical diagram showing one way in which the machine may be wired to accomplish its purpose.

In the machine illustrated there are a plurality of seats for removably securing operatively-stationary tools to the tool head; there is a tool spindle journaled centrally in the tool head, and there are two boring bars mounted above and below the spindle. A chuck and drawbar are mounted in the tool spindle for removably securing drills, taps, reamers, milling cutters, boring bars, etc. thereto to rotate therewith. The tool spindle is rotatable; and it is reciprocable axially. The reciprocating movement permits moving a tool, which is secured to the tool spindle, into operative position and retracting it therefrom. It also permits feed of the tool relative to the work for effecting a drilling or tapping operation, for instance. However, the tool is feedable in the direction of the axis of the tool spindle, and ordinarily feed of the tool is effected by this feed movement of the tool head. Thereby the tool spindle is better supported during the feed, and excessive overhang of the tool is avoided. The boring bars also are reciprocable; but they are not rotatable. The reciprocating movement permits moving them into operative position and retracting them therefrom. It also permits feed of the boring bars relative to the work for boring operations. However, again, feed of a boring bar is preferably achieved by feed of the tool head. Only one boring bar ordinarily is used at a time, the other being retracted.

The work head has two rotary work spindles journaled in it with their axes horizontal, and parallel, and offset from one another. The two spindles project at opposite ends from the work head and carry work-holding chucks at these opposite ends, respectively. The work head also has two stationary chucks mounted on opposite lateral side faces thereof. The work head can be rotated about a vertical axis to position any selected one of the four chucks and the workpiece carried thereby in operative relation with a tool. This rotary adjustment permits chucking or removing a workpiece on or from one work spindle while the workpiece on the other spindle is being operated upon. This rotary adjustment also enables the work head to be adjusted to different angular positions about said vertical axis in order to permit performing various operations at various angles on a workpiece. Means is provided for locking the rotary table, upon which the work head is mounted, in different angular positions of its adjustment about said vertical axis. Means is also provided for locking each work spindle in different angular positions about its axis, as where operations are to be performed at different points around the axis of the workpiece. The whole work head can be taken off the machine and a workpiece can be clamped directly to the table when a large workpiece is to be machined.

The tool head is mounted for adjustment and rectilinear movement horizontally in one direction, for adjustment and rectilinear movement vertically, and for adjustment and rectilinear movement horizontally in a direction at right angles to its two other adjustments and movements. The last-named adjustment and movement is in the direction of the axis of the tool spindle.

The provision of means for holding optionally either the workpiece or the tools stationary, of rotating either the tools or the work, enables a great variety of operations to be performed on the machine, and on a given workpiece without removing the workpiece from the machine. The stationary tools may, for instance, be either turning or facing tools. The several rectilinear adjustments permit of positioning a selected one of these tools at either side of the axis of a workpiece and at different positions axially thereof; and the corresponding rectilinear movements that may be imparted to those tools by movement of the tool head permit effecting desired facing and turning operations when the workpiece is held stationary. For boring operations, the workpiece will ordinarily be rotated, by rotation of the work spindle on which it is mounted, while one of the boring bars is fed axially of the spindle. However, for some boring operations, as when boring a hole in a workpiece at an angle to the axis of the workpiece, the work spindle may be locked against rotation and the boring tool may be secured to the tool spindle which is then rotated to effect the desired boring operation. Drilling, tapping, reaming, and milling operations are effected by securing the required tool to the tool spindle and rotating the tool spindle while feeding it axially and holding the work stationary. The provision of chucks on the sides of the work head as well as of means for holding the work spindle against rotation permits of mounting the workpiece selectively on the side of the work head or on a work spindle. The angular adjustment of the work table about its vertical axis permits of bringing the workpiece, regardless of its mounting, into the required relation to the tool to effect the operation on the workpiece. Where it is required to perform some operations while the workpiece is rotating and others while the workpiece is stationary, the workpiece will be mounted on a work spindle because the work spindle can be rotated when required and locked stationary when required.

With the machine illustrated all the operations listed above can be performed successively in any desirable order on the workpiece without removing the workpiece from the machine. The tool head can be shifted from one position to another to effect operations and/or to bring tools successively into operative position, and the work head can be shifted from one position to another to bring the workpiece into the required operative relation with the tools; and the tool and work spindles can be successively and/or selectively operated to effect the required operations in the elected order. The tools can be shifted manually and all the operations can be manually initiated, controlled, and stopped. However, it is preferred to operate the machine automatically as by tape or punch-card control so that all the operations are performed automatically in the proper sequence. Electrically-operated controls are disclosed for effecting the operations under control of tapes, punch cards or the like, and the shifting operations are effected by hydraulically-operated means governed by these electrical controls.

Referring now to the drawings by numerals of reference, 25 denotes the bed or base of the machine. This is provided at one end at its top with ways 27 (FIG. 1) on which a slide 29 is rectilinearly adjustable and slidable. The slide 29 is held on the ways 27 by gibs 30; and the adjustment and movement is effected by a screw 31 (FIGS. 1 and 14) which is journaled in the slide 29 and threads into a nut (not shown) on the bed. Screw 31 may be driven by motor 32.

Mounted on the slide 29 is an upright or column 26. Slidable vertically on the ways 33 of the upright is a slide 28. The vertical adjustment and movement of the slide 28 is effected by a screw 31' which is journaled in the column 26 and which is driven by a motor 32' through gearing 38, 39, 40 (FIG. 14), and which threads into a nut (not shown) carried by the slide 28. Mounted on the slide 28 to be adjustable horizontally forward and back on the ways 36 (FIG. 2) thereof is another slide 34. Adjustment of the slide 34 on the slide 28 is effected in conventional manner from a motor (not shown) through change gears (not shown), a screw (not shown) journaled in the slide 28, and a nut (not shown) secured to the slide 34.

Figure 3:
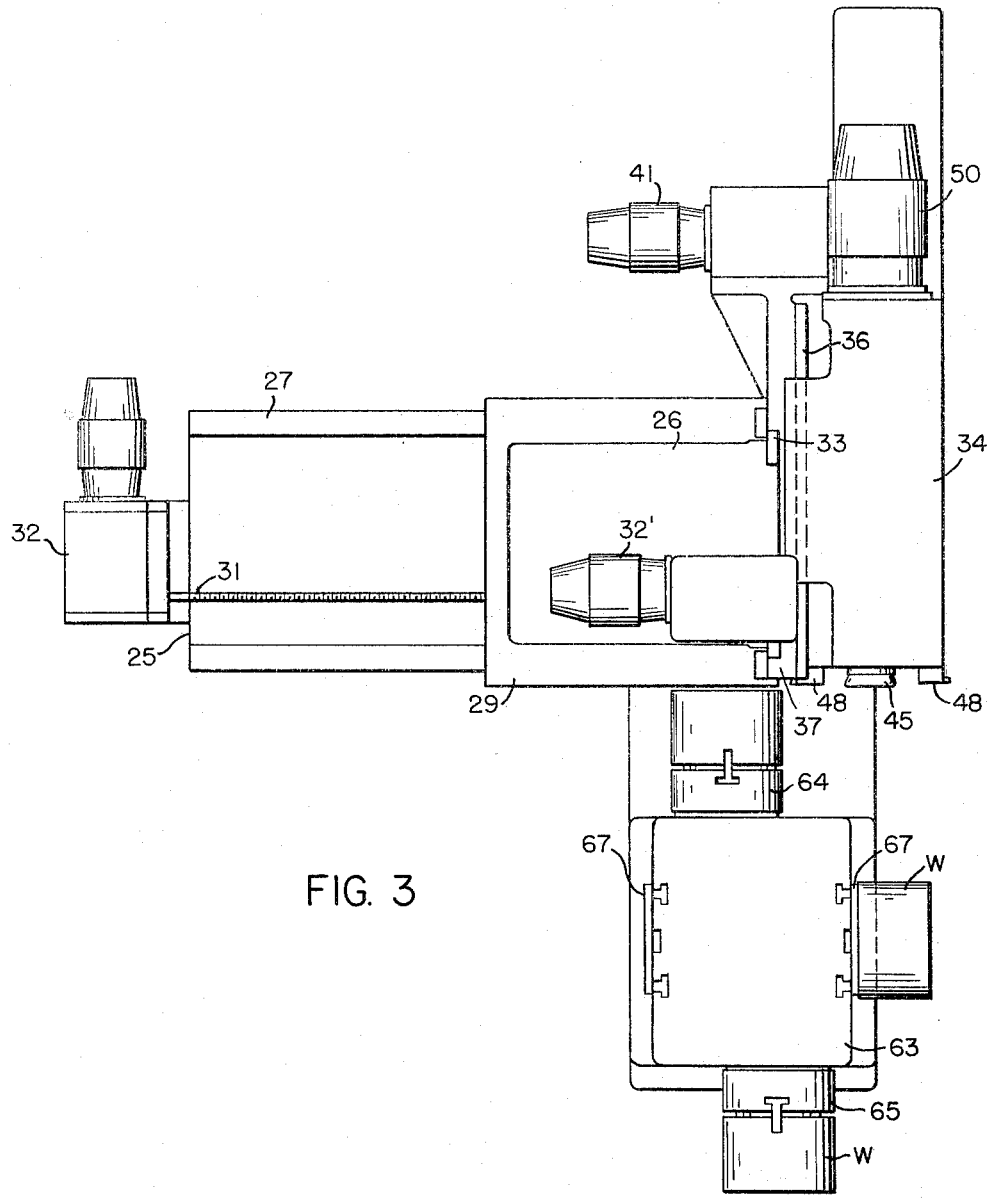
FIG. 3 is a plan view of the machine.

The drives to the three screws for effecting, respectively, the adjustments and movements of slides 29, 28 and 34, respectively, are alike. Each comprises a motor and gear reduction unit, such as unit 32 (FIGS. 3 and 14), gear pairs 38, 39, 40 for driving the screw shaft 31 in one direction, and gear pairs 38, and gear 41 for driving the screw shaft 31 in the opposite direction. FIG. 14 is a developed view; and gear 41 meshes directly with the driven member of the pair 38. Conventional clutches 44 and 46, serve to connect and disconnect the driven member of the pair 39 and the gear 41 from the shafts 43 and 31, respectively. These clutches may be manually, or electromagnetically operated, or in any other suitable manner.

Figure 1:
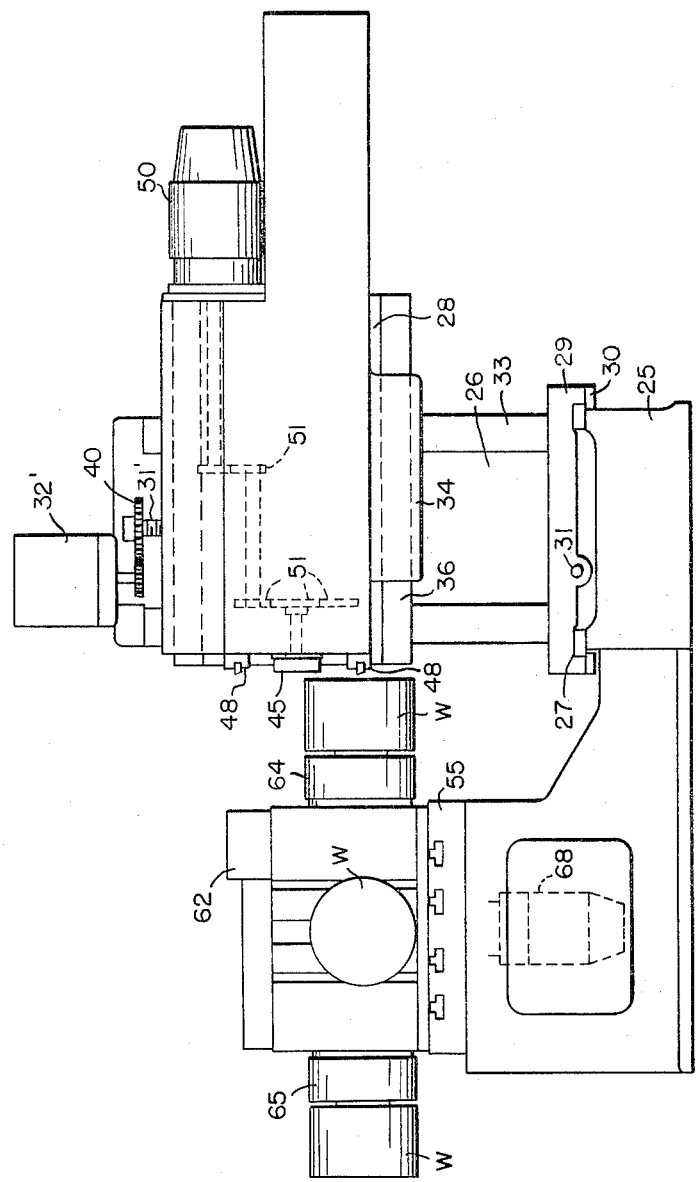
FIG. 1 is a side elevation of a machine built according to one embodiment of this invention.
Figure 2:
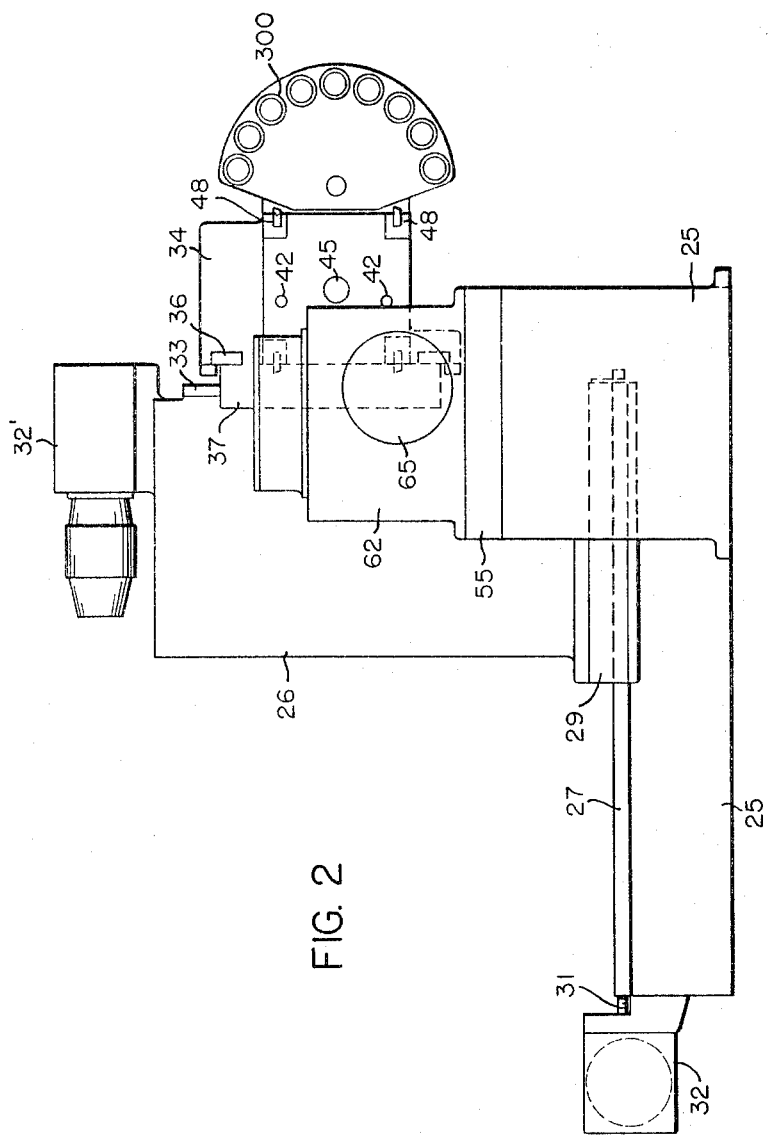
FIG. 2 is an end view of the machine looking at the back of the work head and the front of the tool head and column.

Journaled in the slide 34 centrally thereof is a horizontally extending spindle 45 (FIGS. 2 and 9). Also mounted on the slide 34 are two pop-out boring bars 42 (FIGS. 2 and 12), to which reference will be made further hereinafter. Also provided on the slide 34 are four fixed seats on which turning or facing tools 48 (FIGS. 1 to 8) are removably secured.

The spindle 45 is adapted to be driven from the motor 50 (FIG. 1), which is mounted on the slide 34, through a train of change gearing, portions of which are denoted at 51 (FIG. 1). Conventional change gears and clutches (not shown) are provided to permit drive of the spindle selectively at different speeds and in opposite directions. The spindle is reversible for tapping, for instance. An end or shell milling cutter, a face mill, a drill, a tap, or a similar tool can be secured to the spindle.

The spindle 45, and the two pop-out boring bars 46 are retractible.

The base or bed 25 of the machine at its top and at the opposite end from the slide 29 is provided with a circular plate 52 (FIGS. 15, 18 and 19) on which there is removably mounted a plate 53 which is generally square in plan view. A center or trunnion 54 extends upwardly above plate 53 and on this there is rotatably mountable a table 55. Detachably mounted upon this table is a work head 62 in which there are journaled two rotary spindles 64 and 65, which project at opposite ends beyond the opposite ends of the work head 62, and which are adapted to carry the chucks for holding workpieces that are to be machined. The axes of the two work spindles are offset from but parallel to one another. The provision of two rotating spindles at opposite ends of the work head permits of dechucking a workpiece from one spindle and chucking a new workpiece on that spindle while the workpiece, which is chucked on the other spindle, is being machined. The work head has two other chucks 67 (FIG. 3) on its two sides, also, on which workpieces can be fixedly mounted, where rotation of the workpiece is not required, as in milling, drilling, tapping, etc. The two spindles 64 and 65 can be driven selectively from motor 68 (FIG. 1) through conventional change gears and clutches (not shown).

The rotary table 55, which carries the work head, can be indexed about a vertical axis to bring the different workpieces on the head selectively into operative relation with the tool that is to operate thereon. The work head can also be removed from the rotary work table 55 so as to be able to mount large workpieces directly on the table.

Typical operations, which may be performed on the machine, are illustrated in FIGS. 4 to 8 inclusive. The various adjustments of the tool head permit its movement in a horizontal plane in a direction perpendicular to the axis of the tool spindle 45, movement of the head horizontally in the direction of the axis of the tool spindle, and movement of the head vertically in a direction at right angles to the first two motions. The first motion will hereinafter be referred to as the "X" motion, the second as the "Z" motion, and the third as the "Y" motion.

In FIG. 4, a turning operation on a peripheral surface of a workpiece is illustrated. Here, one of the stationary turning tools 48, which is fixedly secured to the tool head 34, is in position to turn the surface S on the workpiece W. Turning and boring operations occur on the horizontal centerline of the work spindle. The desired diameter $D_1$ of the surface S to be turned on the workpiece is obtained by feeding the cutting tool to the left until the position $P_1$ is reached. The axes $x$ and $y$, respectively, of the tool spindle and of the work spindle are in the same horizontal plane with the axis $x$ of the tool spindle at the distance $P_1$ from the axis $y$ of the work spindle such that the cutting edge of the tool 48 in the finish turning position will be at a radial distance $D_1/2$ from the axis $y$, equal to half the desired diameter $D_1$ of the surface to be turned. Turning is effected by rotating the work spindle on its axis while moving the tool in the "Z" direction, that is, in the direction of the axis $x$ of the tool spindle. The "Y" motion is used to bring the tool to the desired position vertically. A drill D is shown in dotted lines as chucked on the tool spindle 45 ready for a subsequent operation on the workpiece, but the drill is retracted so as not to interfere with the turning operation.

For turning the peripheral surface S' (FIG. 5) of the workpiece W, the tool head 34 can be adjusted horizontally in the X direction until the axis $x$ of the tool spindle is to the left and at the distance $P_2$ from the axis $y$ of the work spindle. This brings the tool 48' into position to turn a surface S' of diameter $D_2$ on the work. With the two axes in the same horizontal plane, the turning operation on the surface S' is then effected by rotating the work spindle on its axis while moving the tool in the Z direction, that is, in the direction of the axis of the tool spindle. Turning is then effected by the tool 48' which is stationary on the tool head, and which is at a radius $D_2/2$ from the axis of the work spindle.

A boring operation is illustrated in FIG. 6. Here one of the boring tools 42 is extended into operative position; and the tool head 34 is adjusted in the X direction so that the axis $x$ of the tool spindle is at a distance $P_3$ from the axis $y$ of the work spindle but is in the same plane with that axis and so that the cutting edge of the tool is at a distance $O_3$ from the axis of the tool spindle thereby to cause the boring tool to bore a hole H of diameter $D_3$ in the workpiece. Boring of the hole is effected by moving the non-rotating boring tool 42 in the Z direction, that is, in the direction of the axis of the tool spindle while rotating the work spindle on its axis $y$.

FIG. 7 illustrates the boring of another, smaller hole which is offset from the axis $y$ of the workpiece. Here the boring tool 42' is secured to the tool spindle 45, and is rotated during the boring operation while the work spindle and the work are held against rotation. The tool head is adjusted in the X direction so that the axis $x$ of the tool spindle is at a distance $P_4$ from the axis $y$ of the work spindle, or from the center line of the workpiece if the workpiece is chucked on one of the flat sides of the work head. The tool then will bore a hole H' in the workpiece of a diameter $D_4$ when the tool spindle is rotated and the tool is fed in the direction of the tool axis.

FIG. 8 illustrates how the work head can be indexed to an angular position for the boring by boring tool 42" of the hole $H_1$ in the workpiece W. The tool head is adjusted so that the axis $x$ of the tool spindle is at a distance $P_6$ from the vertical axis $z$ about which the work head 62 is indexed. The boring operation in the hole $H_1$ is effected by rotating the tool spindle on its axis while holding the work head stationary.

For milling a surface, such as the surface $S_1$ on the workpiece, the boring tool 42" is retracted into the tool spindle; and a face mill M is secured to the tool spindle; and the tool head is adjusted in the Z direction to bring the operating surface of the face mill into the plane P at a distance $P_5$ from the vertical center line $z$ of the work head. For the milling operation, the milling cutter M is rotated by rotating the tool spindle 45, the work is held stationary, and feed is effected in the X direction, that is, perpendicular to the tool spindle.

During milling or turning operations, the drills, end mills, or rotary boring tools, are retracted.

Through the mounting of a plurality of stationary turning tools on the tool head, surfaces of different diameter and different locations can be turned, as illustrated in FIGS. 4 and 5 by merely shifting the tool head without moving the tools on the head. Thereby, the indexing errors of a tool turret, which occur in conventional machines that have a plurality of tools, are avoided. With the machine of the present invention the tool head is shiftable laterally and vertically; and the tools at the four corners of the head can be brought selectively into position for operation. Furthermore, the rotary work chuck and the three adjustments of the tool head permit effecting drilling, face milling, end milling, boring, and turning operations on a single machine.

Moreover, with the work chuck locked against rotation, and by indexing the work head to a series of locked positions, it is possible to mill, drill, bore, and to ream. Furthermore, the holes H' and $H_1$ are in closer concentricity with the rotary axis of the work spindle than is normally obtainable when the workpiece is transferred from one machine to another for different operations such as boring, drilling, etc.

Operations requiring precision location relative to turned, bored, or faced surfaces, can be performed on all sides of the workpiece except that surface against the chuck. The various surface diameters $D_1$, $D_2$, $D_3$ (FIGS. 4, 5 and 6) can be faced, turned and bored by positioning the tool head relative to the work axis. The cutting tools are brought into use without requiring the indexing commonly used on turret lathes and vertical boring mills.

FIG. 12 is a fragmentary section through the tool head showing the means for projecting and retracting the boring bars 42 and 42'. The means is identical for the two bars. The boring bar 42 shown is secured by screws 70 to the head 72 of a cylinder 74. Cylinder 74 is reciprocable in a fixed sleeve 76 that is held in the tool head 34 by a ring 75 which is secured by screws 77 to the front face of the tool head. The rear end of the cylinder 74 is closed by an end plate 78 which is fastened to the cylinder by screws 79. The end plate 78 slides on a piston rod 80 which is secured in fixed position in the tool head by a plate 82 and a nut 84. The piston rod is of reduced diameter adjacent its rear end, forming a shoulder which seats against the front face of plate 82; and its reduced diameter portion projects through the plate 82. The nut 84 threads on the projecting portion of the piston rod to lock the piston rod against motion relative to sleeve 76.

At its front end, the piston rod has a head 86 secured against a shoulder on the piston rod by a nut 88. The cylinder 74 slides on the head 86. Suitable sealing members mounted in the end plates 78 and 86 engage the inside wall of the cylinder 74 and the piston rod 80 to prevent leakage along the piston rod. The cylinder 74 is held against rotation relative to the sleeve 76 by keys 85 which engage in longitudinal groove 87 formed in the cylinder. The head 72 of the cylinder carries a bushing 89 on which it slides in sleeve 76.

Each boring bar is moved into and out of operative position by fluid pressure. The motive fluid is delivered against the front face of the end plate 86 from a line 90 through a longitudinal duct 92 in the piston rod, and a radial duct 94 in a plug 96 which fits into the front end of the duct 92. The motive fluid is delivered to the rear face of the end plate 86 from a line 100 through a duct 102 in the piston rod 80 and the radial duct 104 in the piston rod which communicates with the duct 102.

The boring bars can be moved into and retracted from operative position through a manually operable valve, or under tape control. Application of the hydraulic pressure fluid to the front face of head 86 advances the boring bar; and application of the pressure fluid to the rear face of head 86 retracts the boring bar.

The tool spindle 45 (FIGS. 9 and 10) is journaled directly in the tool head 34 and is hollow. It is journaled on bearings 110 and 111 in the tool head 34. It is adapted to carry in its front end a conventional collet type chuck by means of which various types of tools may be secured to the spindle. The changing and loading of the tools may be effected manually; or by means of an automatic tool-loading mechanism which is illustrated only diagrammatically at 300 in FIG. 2.

The chuck is operated by a draw bar 112 which is secured at its rear end to a block 113 which, in turn, is secured by nuts 114 to a plate 116. Plate 116 is fastened to a cup-shaped member 118 that is secured by a nut 119 to the piston rod 120 of a conventional hydraulic operating mechanism comprising a piston and cylinder 122. When the piston is moved rearwardly the collet is moved to chucking position; and when the piston is moved forwardly the collet is released.

The tool spindle may be adjusted axially in the tool head various amounts for machining surfaces of various depths. The adjustment of the tool spindle may be effected manually; or it may be controlled automatically by microswitches and trips therefor. For the purpose of effecting automatic adjustment and movement a hydraulic piston and cylinder in which the piston reciprocates are provided. The cylinder is denoted at 125 (FIG. 9). The piston rod 126, which is secured to the piston, that reciprocates in cylinder 125, is fastened to a cross head 128 in which the tool spindle 45, which is of reduced diameter at its rear end, is journaled at that end on anti-friction bearings 129 and 130. Secured to the piston rod 126 are a plurality of trip members 135 for tripping control switches as will be described further hereinafter.

The longitudinal position of the tool spindle 45 is determined by a stop bar 140 (FIGS. 11 and 13) which is mounted in a housing 142 that is mounted in the tool head. This stop bar is rotatable in the housing on bushings 144 and 145 by means of a conventional motor unit 146 which is coupled to the bar by a conventional coupling 148. The bar has limited rotary movement in both directions, being stopped by stops 147 and 149 which thread adjustably into the housing and which engage a lug 150 which is secured to the bar.

The bar has teats 152 on its periphery which trip a limit switch 154 when the bar is in the angular and axial position shown in FIG. 13, which is in the position where stoppage of the axial movement of the tool spindle 45 is effected. A teat 155 on the bar trips the limit switch 154 when the bar is at the other limit of its angular movement.

The bar has a slight longitudinal movement, being normally spring-pressed rearwardly by a coil spring 156 which is interposed between one end wall of the casing 142 and the adjacent end of the bar. This spring serves to hold the clutch 148 in engagement with the bar and the drive shaft of the motor unit 146. A limit switch 158 is held closed by the lug 150 when it is in the angular position shown in FIG. 13.

Limit switches 160, 161, 162, 163, 164, and 165 are secured to a plate 166, which is mounted in the housing 142 beneath the bar 140. These limit switches are in position to be tripped by trip members 135 on piston rod 126 (FIG. 9) when the cross head 128 is adjusted longitudinally. These switches effect further operation of the machine when the desired axial position of the tool spindle 45 has been attained, as will be described further hereinafter. The cross head is guided in ways 170 and 171 (FIG. 11) formed on the housing 142 and is held in these ways by the gibs 172 and 173.

As previously stated, the work head 62 is secured to a rotary table 55 (FIG. 15). This table may be driven from a motor (not shown) through a conventional index drive including the bevel gears 180 (FIG. 15), the shaft 181, the spur pinion 182, and the spur gear 183. The last-named gear is secured to the underside of the table 55. The table rotates on journal 54. Limit switches 186, which are adapted to be tripped by lugs 187 on the table, control the rotary position of the table.

The two work spindles 64 and 65 are journaled in the head 62 on anti-friction bearings in parallel offset relation, with the noses 190 and 191, respectively, of the two spindles at opposite ends of the head. The two spindles are driven from a common shaft 192 through pinions 194 and 195, which are secured to the shaft 192, and gears 196 and 197, which mesh with the pinions 194 and 195, respectively, and which are keyed to the shafts 64 and 65, respectively. The shaft 192 is driven from a motor through conventional change gearing and clutches.

The work table is adapted to be locked in any indexed position by means of a pin 200 (FIG. 19) which is adapted to engage selectively in holes in blocks 202 that are secured in the gear 183. There are as many of these blocks angularly spaced from one another in gear 183 as there are angular positions to which it is desirable to index the table. Thus there will be four blocks 202 ninety degrees apart corresponding to the four chucks for workpieces and as many intermediate blocks as there are angular positions to which it is required to index the table for performing operations such as illustrated in FIG. 8.

The pin 200 is moved to and from operative engagement with the blocks 202 by fluid pressure, there being a piston 204 formed integral with the pin which moves in a cylinder 206 that is secured to the bottom of the plate 53. The pin is formed at its lower end with a rib portion 208 which is adapted to trip the microswitches 210 and 211, respectively, in the engaged and disengaged positions, respectively, of the pin. The pin serves to lock the table in a selected angular position about its axis so that a workpiece on either spindle 64 or 65 or in either of the side chucks 67 can be machined, and so that an operation, such as illustrated in FIG. 8, can be performed, where the axis $y$ of a work spindle has to be inclined at an angle to the axis $x$ of the tool spindle.

The pin 200 has a conical tip 214; and the holes in the blocks 202 in which the pin engages are correspondingly shaped. The index motor and the gearing 182, 183 (FIG. 15) driven thereby indexes the table angularly the desired distance; but it is the pin 200, upon entering a hole in gear 183 that precisely positions the table by the engagement of the conical tip of the pin in the internal conical hole of a block 202.

To clamp the table 55 rigidly during a machining operation, a plurality of clamps 220 (FIG. 18) are provided. There may be four or even more of these clamps spaced angularly from one another about the axis of the table. Each is secured to a shaft 221 that is swingable in an arcuate slot in plate 53. Shaft 221 is keyed to the shaft 222 of a conventional rotary hydraulic motor unit, denoted as a whole at 224, which serves to swing the clamp to and from clamping position about a pin 225 which is secured, as by a press fit, in clamp 220 and which fits at its lower end into a recess in plate 53. An axial thrust bearing 226 is interposed between a shoulder on shaft 221 and the underface of plate 53 to take the axial thrusts on the shaft. A limit switch 227 is secured to the unit 224 in position to be tripped by a pin 228 that is fastened to the shaft 222, at the angular position of the shaft corresponding to the clamping position of the clamp, so that as described later, the machine can go on with its machining operations.

This feature of being able to perform operations on a workpiece in a rotary chuck which is positionable at various angles to the tool head, using stationary boring and turning tools, or employing drills, milling cutters, etc. is unique.

To lock each rotary work spindle in different positions, in order to perform different machining operations at different angular positions about the axis of a workpiece, such as drilling and milling operations, an index lock-up mechanism is provided. This is shown in FIG. 16. There is a plate 240 (FIG. 14) secured to each work spindle 64, 65. Each plate carries a plurality of angularly spaced sockets 242 (FIG. 16), which are adapted to receive the conical end of a pin 244 that is slidable in guideways 246 and 247 in the work head. The pin is secured to or integral with a piston 248 which is reciprocable in a cylinder 250 that is secured to the work head. Hydraulic motive fluid is supplied to opposite faces of the piston through ducts 252 and 254, respectively. A limit switch 256 is secured to the rear end of the cylinder 250 in position to be tripped by the piston 248. Upon application of fluid pressure to the front face of the piston 248 the pin 244 is retracted; and upon application of fluid pressure to the rear face of the piston the pin is moved to locking position. As with pin 200 (FIG. 19), the tip of pin 244 is conical.

Indexing of the two work spindles is effected by conventional indexing mechanism driven by motor 68. Motor 68 is mounted in the base of the machine and drives the indexing mechanism through gearing including the spur gearing 258 (FIG. 15) and shaft 259.

The different angular positions to which each work spindle can be adjusted, and in which it can be locked, permit machining of bolt holes, keyways, etc. in a part which has previously been turned, bored, grooved, etc. while it was rotating.

The position of the main tool spindle 45 (FIGS. 11 and 13), and its axial movement can be controlled manually. For automatic operation, as previously stated, the axial movement of this spindle is controlled by the bar 140. The spindle 45 has five forward fixed stop working positions and a retracted position, making a total of six fixed positions. These may be selected manually through use of a conventional six-position control switch, or by tape. The six limit switches 160, 161, 162, 163, 164, 165, which are located along the line of travel of the crosshead 128, determine the positions to which the spindle is moved. One of these switches will be selectively activated depending upon the selected position of the spindle.

The axial movement of the spindle 45 is effected by the piston rod 126 (FIGS. 9 and 11) operating through the crosshead 128. Piston rod 126 is secured to a piston 127 (FIG. 21) reciprocable in the cylinder 125 (FIGS. 9 and 21). The position of piston 127 is controlled by a valve 250 (FIG. 21) which is moved in opposite directions by hydraulic pressure applied through pistons reciprocable in cylinders 251 and 252 operating against springs 253 and 254. The position of the valve 250 is in turn controlled by valve 256 which is moved in one direction by solenoid 257 operating against spring 259 and in the opposite direction by solenoid 258 operating against spring 260. The pressure fluid is supplied to the valves from the sump 262 by pump 265 driven by motor 266. It is delivered through ducts or lines 267 and 268 to the valves and exhausted through line 269 which leads to the sump. Ducts or lines 271 and 272 connect valve 250 with opposite sides of the piston 127.

For determining the fixed working position of the tool spindle 45 the rotatable stop bar 140 (FIGS. 11 and 13) powered by a conventional hydraulic motor 146 (FIG. 13) swings into the "in" position upon signal, providing accurate positioning when a lug 150 on the stop bar contacts a stop on the tool head. The stop bar must be retracted whenever the spindle is moved.

The direction of swing of the stop bar 140 is controlled by the valve 275 (FIG. 21), which is shifted in opposite directions upon energization of the solenoids 276, 277, respectively. The pressure fluid flows to the valve from line 267 through lines 278 and 279, and exhausts through line 280. Ducts 281 and 282 connect valve 275 with opposite sides of the rotor of the motor 140.

The draw bar 112 (FIG. 9), by means of which a tool is secured to the tool spindle 45, is actuated by a piston 285 (FIG. 21) which is reciprocable in cylinder 122. The position of the draw bar is controlled by a valve 286 which is moved in opposite directions by hydraulical means denoted at 287 and 288. The position of valve 286 is in turn controlled by a valve 290 which is moved in opposite directions by solenoids 291 and 292. The pressure fluid is supplied to these valves 286 and 290 from duct 267 through line 293, and is exhausted by line 294 to the sump. Ducts 295 and 296 connect the valve 286 with opposite sides of piston 285.

Where an automatic tool changer 300 (FIG. 2) is used it may be driven by a rotary motor 301 (FIG. 21), the direction of rotation of which is controlled by a valve 302, which is shifted in opposite directions by solenoids 303 and 304, respectively. The pressure fluid is supplied to valve 302 from line 267 through line 305, and exhausted through line 306. Ducts 307 and 308 connect the valve 302 with opposite sides of the rotor of motor 301.

The tool changer can carry a plurality of tools and for changing a tool is swung first to align an empty tool holder with the tool, which is to be removed from the spindle 45. Then the drawbar 112 (FIG. 9) is moved forward to release the tool-holding chuck. The tool is then removed from spindle 45 by the tool changer. Then the tool holder is swung to bring another tool into alignment with the spindle 45, the new tool is pushed into the chuck; the drawbar 112 is moved rearwardly to secure the tool in the tool holder, and the machine is ready to proceed to perform the next operation on the workpiece.

The tool changer is locked in each of the positions to which it is swung by a hydraulically-actuated stop, of which there is one for each position of the tool changer. These are identical and only one is shown in FIG. 21. The stop is denoted diagrammatically at 310. It is moved to and from operative position by a piston 311 which reciprocates in a cylinder 312. The direction of movement of the piston is controlled by valve 314 which is moved in opposite directions by solenoid 315 and spring 316, respectively. The motive fluid is supplied to the valve from line 267 through line 318, and is exhausted through line 319. Ducts 320 and 321 connect the valve 314 with cylinder 312.

For positioning a tool in the chuck or removing it therefrom a hydraulically operated tool positioner is provided. This is operated by a piston 324 (FIG. 21) which is reciprocable in a cylinder 325. The direction of movement of piston 324 is controlled by valve 326.

Valve 326 is shifted in opposite directions by solenoids 327 and 328, respectively. The motive fluid is supplied to valve 326 from line 267 through line 330, and is exhausted through line 331. Ducts 332 and 333 connect valve 326 with opposite ends of cylinder 325.

Each of the pop-out tools 42 (FIG. 12) is, as previously described, moved to and from operative position hydraulically through movement of cylinder 74 on stationary piston 86. The direction of movement of cylinder 74 is controlled by valve 335 (FIG. 21) whose movement is effected by hydraulic means denoted at 336 and 337. The movement of valve 335 is controlled, in turn, by valve 338 which is moved in opposite directions upon energization of the solenoids 339 and 340, respectively. The motive fluid is supplied to the valves 338 and 335 from line 267 through line 278 and is exhausted through line 342. Ducts 102 and 92 are connected to valve 335.

The indexing of the work table 55 (FIGS. 15 and 19) is effected by a hydraulic motor which is indicated diagrammatically at 348 in FIG. 20. The movement of the table is controlled by a valve 343 which is shiftable in opposite directions by hydraulic means denoted at 341 and 342, respectively. Valve 343, in turn, is controlled by valve 344 which is shiftable in opposite directions by solenoids 345 and 346, respectively. The motive fluid is supplied to the valves 343 and 344 from pumps 350 and 351, which are driven by a motor 352, through a line 354, and is exhausted through line 355 to sump 262. The ducts 357 and 358 connect valve 343 with the index motor 348. A ball check valve 359 controls the direction of flow of the fluid in line 357.

The work table is locked up in any indexed position by pin 200 (FIGS. 19 and 20) which is operated by piston 204. The movement of the piston 204 to and from operative position is controlled by valve 365 (FIG. 20), which is spring pressed to the position shown in FIG. 20 by spring 366, and moved in the opposite direction by solenoid 367. The hydraulic motive fluid is supplied to the valve from line 354 through line 368, and is exhausted through line 369. Ducts 370 and 371 connect valve 365 with cylinder 206 at opposite sides of piston 204.

After indexing, the work table is also clamped in adjusted position by clamps 220, one of which is shown in FIGS. 18 and 20. The rotation of each clamp to and from clamping position is controlled by a valve 375 which is shifted in opposite directions by hydraulic means denoted at 376 and 377, respectively. The direction of movement of valve 375 is, in turn, controlled by valve 378 which is shifted in opposite directions by solenoids 380 and 381, respectively. The motive fluid is supplied to the valves from line 354 through lines 368 and 382, and is exhausted through line 384. Valve 375 is connected to a motor 385, which operates each clamp 220 through duct 386; and this motor is also connected to the valve 375 through a line 387, a line 388, a ball check valve 390, a line 391, and a line 392. A conventional pressure-reducing valve 394 is also connected in line 392 and by line 395. A spring 396 constantly urges the reducing valve 394 in one direction. Valve 394 is connected by duct 397 to the sump.

Each of the work spindles 64 and 65 is locked up in indexed positions by a pin, such as shown at 244 in FIGS. 16 and 20. Only one of these pins and its operating mechanism will be described in detail. The other pin and its parts is designated by the same reference numerals in FIG. 20, only primed.

The movement of pin 244 into and out of operative position is controlled by a valve 400. This valve is constantly urged in a direction to hold pin 244 in operative position by a coil spring 401. It is moved in the opposite direction by solenoid 402. The motive fluid for moving the index pin 244 into and out of operative position is supplied from a pump 405, which is driven by a motor 406, through line 407, and is exhausted through line 408.

Ducts 409 and 410 connect the valve 400 with cylinder 250 at opposite sides of piston 248.

One way in which the machine may be wired to accomplish its purpose is illustrated in FIGS. 22a and 22b. $L_1$ and $L_2$ are the main lines. In the idle position of the machine the manually or tape operated double-throw switch 420 is in the position shown in FIG. 22a; the relay coil 421 is energized, and switch arms $421_1$ and $421_2$ of this relay are open.

At the same time relay coil 422 is deenergized; and switch arms $422_1$ and $422_2$ of this relay are open.

When the switch 420 is closed either manually or by operation of the tape, the machine operations can be started. For the purpose the cycle start button 426 is closed manually or by tape. This energizes relay coil 422, closing arms $422_1$ and $422_2$ of this relay.

The machine can be stopped by pressing normally closed stop button 427. Closing of relay arm $422_2$ closes a hold-in circuit to relay coil 422; and this coil remains energized so long as the stop button 427 is not pushed open, or the tape does not cause opening of switch 420 or this switch is not opened manually.

The auxiliary motors 266, 352, 406, etc. of the machine including the several hydraulic and coolant pump motors are started and stopped by a manually operable switch 428, which is shown in FIG. 22a in the off position.

As previously stated, the tool spindle 45 is driven by a conventional change gear drive including gears 51 (FIG. 1). These gears can be shifted and clutched to the spindle in conventional manner. Shifting of these change gears closes a normally open switch 440 (FIG. 22) which energizes relay coil 441. This closes the relay arms $441_1$ and $441_2$ of this relay. Closing of relay arm $441_1$ closes the circuit to, and starts, the tool spindle drive motor 442, to rotate the tool spindle 45.

When the switch arm 446 is moved manually or by tape to closed position, a circuit is made to relay coil 448 through a normally-closed relay arm $450_1$. This closes arm $448_1$ of the relay to maintain a hold-in circuit to motor 442 even though switch 440 opens when the gear shift is completed. This circuit is maintained so long as relay coil 421 is deenergized, which means relay arm $421_1$ is closed. The speed of motor 442 is controlled by variable controller 450.

When relay coil 448 is energized, as described above, relay arm $448_2$ is closed and the electromagnetic clutch 454 is energized if the switch arm 452 is in the full line position shown in FIG. 22. This causes engagement of the proper clutch in the tool spindle drive to cause the tool spindle to be driven in a clockwise direction. This circuit is maintained as long as the switch arm 452 is in the stated position and as long as relay coil 441 is energized, which means as long as relay arm $441_2$ is closed.

Switch arms 452 may be shifted manually or by tape control.

When switch arm 452 is shifted to the dotted line position shown in FIG. 22, the counterclockwise electromagnetic clutch 456 is energized so that the clutch and change gears are engaged which drive the tool spindle in a counterclockwise direction, as for tapping.

When the piston 127 (FIG. 21) is in its retracted position, limit switch 165 (FIGS. 21 and 22) is closed and a circuit is made to solenoid 340 (FIGS. 21 and 22a) through limit switch 425 which is at this time closed, and through relay arm $462_5$ associated with relay coil 462. This effects shifting of valves 338 and 335 (FIG. 21) and permits withdrawing boring tool 42 (FIGS. 12 and 21).

458 (FIG. 22a) is a switch that can be closed manually or under tape control. When it is closed, a circuit can be made through relay arm $460_1$ associated with relay coil 460, and through relay arm $462_2$ associated with relay coil 462 to relay coil 464. This closes relay arm 464; and, if switch arm 466 is in the position shown and relay arm 465 is closed, will complete the circuit to relay coil 460 through closed relay arm 465 and through relay arm $462_1$ which is associated with relay coil 462. This will cause relay arm $460_1$ to be opened but circuit to relay coil 464 is maintained, so long as switch 458 is closed, through relay arm $464_2$ associated with relay coil 464 and which is closed upon energizing coil 464. This circuit can also be maintained through relay arm $460_3$ as long as associated relay coil 460 is energized. Likewise it can also be maintained through relay arm $462_4$ as long as associated relay coil 462 is energized. Relay arms 465 and 467, respectively, must be closed to energize coils 460 and 462, respectively. These relay arms 465 and 467 are associated with coils that are energized alternately.

As long as coil 462 is deenergized, relay arm $462_3$, which is associated with this relay coil 462, is closed, and solenoid 339 (FIG. 21) is energized causing the boring tool 42 (FIG. 12) to be advanced as described with reference to FIG. 21.

When switch arm 466 is moved to contact terminal 468, and the coil associated with relay arm 467 is energized, relay coil 462 is energized, and relay arm $462_3$ is opened, and relay arm $462_5$ is closed. This energizes solenoid 340 (FIGS. 21 and 22) causing the piston 86 (FIG. 12) and the associated boring tool 42 to be retracted.

A switch 480 (FIG. 22a) determines the position of the selector bar 140 (FIGS. 11 and 13).

When the relay coil 421 (FIG. 22a) is energized, as described above, the relay arm $421_2$ associated with this coil is closed, making a circuit through this arm and switch 480, when in the position shown in full lines in FIG. 22a, the switches 154 and 153 to relay coil 476. This causes relay arm $476_1$ to be closed, causing solenoid 257 (FIGS. 21 and 22a) to be energized, to shift valve 256 (FIG. 21) in a direction to cause forward movement of the tool spindle 45. At this time switch arm $470_4$, which is associated with relay coil 470, is open and solenoid 258 (FIG. 22b) is deenergized.

When bar position selector switch 480 is in the dotted line position denoted at $480_1$, circuits to relay coils 476 and 478 are made, upon closing of relay arm $421_2$. The circuit to relay coil 478 is through closed relay arm $470_2$ associated with relay coil 470. The circuit to relay coil 476 is through switches 154 and 153 (FIGS. 11 and 13).

When the selector switch 480 is in the dotted line position $480_2$, a circuit is made, upon the closing of relay arm $421_2$, to relay coil 470. This is the position for retraction of tool spindle 45. This closes relay arm $470_1$ which is associated with relay coil 470; and, if relay arm $472_1$ is closed by energization of relay coil 472, then relay coil 474 is energized. Relay coil 472 is actuated upon closing of limit switch 158 (FIGS. 13 and 22a) which occurs when the bar 140 is moved forwardly.

When the selector switch 480 is in the dotted line position $480_3$, and the tap start switch 484 is closed either manually or by tape command, and the relay arm $448_3$ associated with relay coil 448 is closed by energization of that coil, as described above, relay coil 486 is energized. This closes relay arms $486_1$ and $486_2$ to maintain the circuits to the coils 476, 478 and 486 closed. Relay coils 486, 476, and 478 are interlocked through relay arms $486_1$, $486_2$, $486_3$, $486_4$, $488_1$, $490_1$, $488_2$, $470_2$, $470_3$, $472_4$ $490_2$, $490_3$.

The pressure on the tap can be varied but this forms no part of the present invention, and will not be described in detail here.

When relay arm $474_1$ is closed, solenoid 277 (FIGS. 21 and 22a) is energized to swing the control bar 140 (FIGS. 11 and 13) into stop position to limit the feed movement of the tool spindle by opening limit switch 154 while limit switch 153 is open.

When switch arm $490_1$ is closed, solenoid 276 is energized to swing the stop bar 140 out of stopping position.

When switch arm 476' is closed, solenoid 257 is energized to move valves 256 and 250 to neutral positions as shown in FIG. 21, thereby to lock the piston 127 in retracted position.

When relay arm $470_4$ (FIG. 22b) is closed by energization of relay coil 470, and relay arm $472_4$ is closed by energization of relay coil 474, solenoid 258 is energized to cause in-feed of the tool spindle 45. This solenoid remains energized even though relay arm $472_4$ be opened by deenergization of relay coil 472, so long as relay arm $470_4$ remains closed and limit switch 492 is closed. The solenoid 258 is also energized as long as relay arms $486_5$ and $490_3$ remain closed, that is as long as relay coils 486 and 490 are energized.

The tool changer 300 (FIG. 2) is shifted upon closing of switch 494 manually or by hand, providing limit switches 154, 165, and 425 are closed, that is, providing the spindle positioning bar is out of operative position, the tool spindle is retracted, and the pop out tools are retracted.

When limit switch 430 and relay arm $450_2$ are closed a holding circuit is also made to relay coil 450. Energization of relay coil 450 also closes switch arm $450_2$.

Limit switches 431, 432, 309 are all connected to a step switch 495 of conventional construction which controls the position of the tool changer. This step switch is reset upon closing of a limit switch 496. The solenoids 327, 328, 304, 303 (FIGS. 22b and 21), which control the position of the tool changer and the loading and unloading of tools, are controlled by this step switch, which successively closes switch arms $495_1$, $495_2$, $495_3$, $495_4$, $495_5$ and $495_6$.

The speed drive motor 32 (FIGS. 3 and 14), which effects movement of the tool column 26 (FIGS. 1 and 4) in the "X" direction, is actuated when the programming switch 505 is closed under tape command. If the movement is to be to the left the switch arm 506 is left in the full line position shown and the circuit is made through the limit switch 500; if the movement is to be to the right the switch arm 506 is shifted to the dotted line position 506' and the circuit is made through limit switch 501. For jogging, for adjustment of the column 26, jogging switch 502 is closed manually.

The three feed drives in the three directions "X," "Y" and "Z" are all alike. Only the "Z" drive is shown. The only difference between them is that in the case of feed in the "Y" direction, switch 506 determines whether the movement is up or down, while in the case of feed in the "Z" direction this switch determines whether movement is forward or back.

The work spindle rotation is started by closing switch 510 (FIG. 22b) either manually or by tape command. Closing of this switch closes a circuit to a relay coil 512 through a normally-closed, manually-operable stop button 514, limit switch 210, a Selsyn switch 514, if in the position shown in FIG. 22, and the relay arm $516_1$, associated with the relay coil 516.

When switch 514 is in the position shown, the work spindle rotates clockwise. When the switch arm 514 is shifted to make contact at terminal 518, the work spindle is driven counterclockwise, and the coil 516 is in circuit through relay arm $512_1$. When relay coil 512 is energized relay arm $512_1$ is opened; and when relay coil 516 is energized relay arm $516_1$ is opened.

Both relay coils operate to maintain their own hold-in circuits, as long as they are energized, even though work spindle start button 510 opens when released. The circuit to coil 512 is held closed through associated relay arm $512_2$ when coil 512 is energized; and the circuit to coil 516 is held closed through associated relay arm $516_2$ when coil 516 is energized.

To effect clamping of the work head, solenoid 381 (FIGS. 21 and 22b) is energized as previously described. The circuit to this solenoid is completed when limit switch 210 (FIGS. 19 and 22b) is closed, that is, when the index shot pin 200 (FIG. 19) is in operating position. It is opened when either this limit switch 210 is opened, or relay arm $520_1$ is opened by energization of relay coil 520.

To unclamp the work head, solenoid 380 (FIGS. 20 and 22b) is energized. This happens when relay coil 520 is energized and associated relay arm $520_2$ is closed. When the work head is unclamped, limit switch 227 (FIGS. 18 and 22b) is closed. This closes a circuit to relay coil 522 (FIG. 22b).

Energization of relay coil 522 closes the associated relay arm $522_1$. If limit switch 524 is closed then, the index shot pin 200 (FIG. 19) is disengaged through energization of solenoid 367 (FIGS. 20 and 22b). Energization of relay coil 520 closes relay arm $520_3$ associated with this coil and provides a hold-in circuit to the solenoid 367 after limit switch 524 is released.

When switch 211 (FIGS. 19 and 22b) is closed and relay coil 520 is energized, relay arm $520_4$ will be closed, energizing solenoid 346 (FIGS. 20 and 22b) which causes forward indexing movement of the work table. Reverse indexing movement is effected when solenoid 345 is energized. Energizing of relay coil 520 closes associated relay arm $520_4$ and opens associated relay arm $520_5$, and vice versa.

The circuit to work head drive spindle motor 525 is through relay arm $512_3$ when closed, upon energization of relay coil 512. Rheostat 526 controls the speed of the motor. The motor is driven in the reverse direction, when relay arm $516_3$ associated with relay 516 is closed. A controller 528 governs the speed of the motor in this reverse, counterclockwise direction.

The work table 55 itself can be indexed by closing switch 530 manually or by tape command. The coil 520 is energized when this switch is closed, selector switch 532 is in the position indicated in FIG. 22, and limit switches 534, 425, 211 (FIG. 19) and 165 (FIGS. 13 and 21) are closed, that is, when the work head is in the indexed position, the pop out boring tools 42 (FIG. 12) are retracted, and the tool spindle 45 (FIG. 9) is retracted.

For other positions of the work head, the selector switch arm 532 is adjusted to make contacts selectively with terminals 535, 537, 539, respectively, and limit switches 536, 538, 540, respectively, are closed.

For indexing the work spindle 64 or 65, whichever is in operating position, the switch 542 is closed manually or by tape command. This closes a circuit to relay coil 544 through the now-closed relay arm $548_1$, associated with relay coil 548. When coil 544 is energized normally closed relay arm $544_1$ is opened. Relay arm $548_1$ remains closed as long as relay coil 548 is energized. Stop button 522 maintains the circuit to coil 548. This button can be opened manually or upon tape command.

The index shot pin 244 (FIG. 16) is retracted when relay arm $544_2$ is closed by energization of associated relay coil 544, the three blade switch 552 being at this time in the position shown in FIG. 22b. Solenoid 554, which controls the operation of a clutch 556 (FIG. 15) in the work spindle drive, is energized to hold this clutch engaged to drive the spindle. Simultaneously solenoid 402 (FIGS. 21 and 22) moves valve 400 from the position shown in FIG. 20 to retract the index shot pin 244 from the hole 242 (FIG. 16) in a plate 240 (FIGS. 15 and 16) with which it has been engaged.

When the switch 552 is shifted manually or by tape command, the solenoid 554 is deenergized, the drive to the work spindle is disengaged, but the shot pin 244 remains retracted until relay arm $422_1$ (FIG. 22a) is opened.

A typical sequence of operations is as follows:

(1) The stop out and retract solenoids 276 and 258, respectively (FIGS. 21 and 22b) of bar 140 (FIGS. 9 and 10) are energized.

(2) Signal is given to move the tool spindle 45 to the in-fed position defined by limit switch 162, for instance. Bar retract solenoid 258 is deenergized.

(3) The stop out limit switch 154 (FIGS. 21 and 22a) being contacted permits the bar forward solenoid 257 to be energized; and the bar 140 moves forward, advancing over the deactivated position limit switches 164, 163 and contacts the position limit switch 162 deenergizing the bar forward solenoid 257.

(4) The bar stop "out" solenoid 276 (FIG. 22a) is deenergized and the bar stop "in" solenoid 277 is energized.

(5) The bar stop 140 moves to "in" position contacting limit switch 157.

(6) The stop-in limit switch 153 (FIGS. 21 and 22a) energizes the bar forward solenoid 257 causing the bar 140 to move forward against the stop and contacting the limit switch 157 signalling that the bar is in the desired position.

Preferably, the positioning circuit is designed so that it is necessary to retract the bar 140 to its extreme position before it can be moved to another working position. Normally this will be the required operation when changing tools.

For the tool changing operation, the draw bolt 112 (FIGS. 9 and 21) is operated by a hydraulically-actuated cylinder and piston 122–285 (FIGS. 9 and 21) controlled by a double solenoid-operated valve 290 (FIG. 21). The draw bolt has two positions, namely, (1) the release position (for enabling the tool to be removed from the tool spindle 45 and put into the tool holder 300 (FIG. 2)), and (2) the expanded position (by which the tool is secured to the tool spindle). Limit switches 434 and 435 (FIGS. 9 and 21) are contacted at both ends of the travel of cylinder 118 (FIG. 9).

For automatic operation, a rotary tool changer 300 (FIG. 2) may be employed. The tool change mechanism may consist of a nine position rotating tool holder as shown in FIG. 2 which is advanced one position at a time by operation of a hydraulic motor 301 (FIG. 21). The tool holder is moved in and out of tool changing position by piston 324 (FIG. 21).

The tool changer is not specifically illustrated. However, it is intended to carry a plurality of tools, nine in the instance illustrated (FIG. 2). In operation the drawbar 112 is advanced to release the tool then in the chuck; the tool changer is indexed to bring the empty tool holder in the changer into alignment with the chuck; the tool is withdrawn from the released chuck; the tool changer is indexed to bring the next tool into alignment with the chuck; this tool is pushed into the chuck; the drawbar is retracted to chuck the new tool; the tool changer is swung out of the way; and the operations of the machine resume. The movements of the drawbar are, of course, controlled by solenoids 291 and 292 (FIGS. 21 and 22b) and limit switches 434 and 435 are tripped at opposite ends of the drawbar movement. The movements of the tool holder are effected through energization of the solenoids 303 and 304; and the tool changer is stopped successively in each of its indexed positions by stop 310 (FIG. 21) whose movement is controlled by solenoid 315. In stopped position the limit switch 432 is tripped.

The tools will be inserted into the tool holder in sequence as indicated by the programmer.

The two non-rotating, manually-loaded pop out holders 72 (FIG. 12) for the boring tools 42 are actuated by independent hydraulic cylinders 74 controlled by the solenoids 339, 340 (FIGS. 21 and 22a). Limit switch 425 is tripped at the return end of the cylinder travel. Electric interlocking prevents both tool holders from being extended simultaneously. The drawbar 112 (FIGS. 9 and 21) must be retracted before either boring tool holder can be extended. The drawbar will remain retracted at all times when using the boring tools but the tool head may be advanced after a boring tool holder is extended.

As previously stated, the work head table 55 may be indexed to any one of four major positions to bring the workpiece carried by one of the work head chucks into operative position. Additionally there are auxiliary positions to which the work table may be indexed for operations such as illustrated in FIG. 8. Four sets of limit switches 210, 211 (FIGS. 19, 20 and 22b) are mounted on the bed 25 of the machine to be contacted in only one position by dog 200. The position to which the head is indexed may be selected manually or by tape control.

Indexing of the work table 55 is accomplished by hydraulic motor 348 (FIG. 20) under control of solenoids 345 and 346.

The work table 55 is indexed until the preselected limit switch is contacted. This deenergizes the forward solenoid 346, stopping the index, and energizes the reverse solenoid 345, reversing the head at slow speed until the limit switch for applying the shot pin 200 is contacted, which will deenergize the reverse solenoid 345 and energize the shot pin solenoid 367.

Limit switch 211 will then initiate the work clamping sequence. Three conventional hydromotors 224 (FIGS. 18 and 20) are controlled by one double solenoid operated valve 378. These motors must be in the unclamped position, each contacting a limit switch 227, before the head can be indexed. Upon engagement of the shot pin 200, the unclamp solenoid 381 is deenergized; and the clamp solenoid 380 is energized, moving the motors 224 into clamping position. The head is clamped only when the three limit switches have been released. The work spindle 64 or 65 cannot be started until the work head is clamped.

When the work spindle 64 is in operative position, the drive motor for the work spindles will rotate in the forward direction to cause spindle 64 to rotate forward. However, when the spindle 65 is in working position, the spindle motor must rotate in the reverse direction to drive spindle 65 forward.

Each work spindle may be indexed to a specific angular position and locked by applying shot pin 244, 244' (FIGS. 16 and 20). The solenoids 402, 402' for releasing the shot pins 244, 244' and for engaging the spindle are connected in parallel. A limit switch 256, 256' prevents energizing the spindle engaged solenoid until the shot pin 244, 244' is released. Indexing will be done by a hydraulic motor 406.

The sequence of indexing the work spindle is as follows:

(1) Either through manual operation or by tape a signal calls for the spindle to be indexed. The spindle motor must be stopped. The solenoid 346 for the hydraulic motor 348 is energized to turn the spindle.

(2) The spindle indexes, contacting a limit switch which energizes a timer set to deenergize the hydromotor 348 in the forward direction as soon as the spindle indexes beyond the limit switch.

(3) The timer times out energizing the reverse solenoid 345 causing the hydraulic motor to run at slow speed until the spindle contacts the limit switch the second time.

Contacting of the limit switch the second time deenergizes the engaged spindle solenoid, releases the release pin solenoid 402, 402', and applies the shot pin 244.

Both spindle shot pins must be engaged before the work table 55 can be indexed.

From the preceding description it will be seen that a series of rotary operations, such as turning, boring and facing can be combined with a subsequent series of secondary operations in which the workpiece is held stationary during machining, and in which in some cases the chuck may be indexed to an additional position. These subsequent operations may involve rotary cutting operations, such as boring, drilling, end milling, reaming, counterboring, etc. The machine of this invention, therefore, permits combination of the series of secondary operations with the prior turning, boring and facing operations, which are done with the rotary chuck.

A novel feature of the present invention is that these secondary operations can be performed in predetermined relationship to the primary rotary operation, and with an improved degree of concentricity with the rotary axis of the workpiece, due to the fact that the workpiece need not be set up on a series of subsequent machine tools in order to obtain these secondary operations. It is well known that it is difficult to locate a workpiece accurately in relation to prior machined surfaces when moving it from one machine to another.

Other novel features of the machine include hydraulic feed of a tap, and screw feed of a drill against a stop. The tool spindle 45 is actuated at a point in the in-feed under control of a tape to position bar 140 (FIGS. 9 and 11) in accordance with a selected limit switch 158 to 165 (FIGS. 9, 10 and 21) to control the depth of feed of the tool. When tapping is being effected, the tool spindle 45 is then reversed to unscrew the tap and pull it out of the workpiece.

There is nothing unique about the electronic control in itself of the machine; and our machine can use any one of a half dozen different types of commercial control systems already well known and available for this purpose. The machining program is based upon utilizing these well known controls to produce a machine part to predetermined dimensions by programming a series of cutting operations in suitable sequence, the specific tool positions being determined by the dimensions of the part in relation to the tool head and the work head.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:
1. A machine tool comprising
 (a) a tool support,
 (b) a tool spindle journaled in said tool support,
 (c) means for securing a tool to said tool spindle to rotate therewith,
 (d) means for securing another tool fixedly on said tool support in offset relation to said tool spindle and against rotation relative to said tool support,
 (e) a work support,
 (f) a work spindle journaled in said work support,
 (g) means for securing a workpiece to said work spindle,
 (h) means for adjusting said supports relative to one another to bring the workpiece selectively into operative relation to one of said tools, and
 (i) means for selectively rotating one of said spindles.
2. A machine tool as claimed in claim 1, wherein means is provided for rotating both said spindles.
3. A machine tool as claimed in claim 1, wherein means is provided for rotating said tool spindle in opposite directions and for simultaneously moving it axially in either direction.
4. A machine tool as claimed in claim 1, wherein said adjusting means comprises means for adjusting said tool support horizontally at right angles to the axis of said tool spindle, vertically, and axially of said tool spindle.
5. A machine tool comprising
 (a) a tool support,
 (b) a tool spindle journaled in said tool support,
 (c) means for securing a tool to said tool spindle to rotate therewith,
 (d) means for securing another tool to said tool support in offset relation to said tool spindle and against rotation relative to said tool support,
 (e) a work support,
 (f) a work spindle journaled in said work support,

(g) means for securing a workpiece to said work spindle to rotate therewith,
(h) means for securing a workpiece to said work support in offset relation to said work spindle and in fixed relation to said work support,
(i) means for adjusting said supports relative to one another to bring a workpiece, which is secured to said work spindle, selectively into operative relation with either of said tools, and for adjusting a workpiece, which is secured fixedly to said work support into operative relation with a tool secured to said tool spindle, and
(j) means for rotating both of said spindles.

6. A machine tool as claimed in claim 5, wherein
(a) said work support is mounted to be adjustable angularly about an axis perpendicular to the axis of said work spindle,
(b) said work spindle is indexable about its axis,
(c) and means are provided for locking said work spindle against rotation and for locking said work support in any adjusted angular position.

7. A machine tool comprising
(a) a tool support,
(b) a tool spindle journaled in said tool support,
(c) means for securing a first tool to said tool spindle to rotate therewith,
(d) means for moving said tool spindle axially in opposite directions to advance and retract a tool secured thereto,
(e) means for mounting a second tool non-rotatably on said tool support in offset, parallel relation to said tool spindle,
(f) means for moving said mounting means on said tool support in opposite directions parallel to the axis of said tool spindle to advance and retract said second tool,
(g) a work support,
(h) a work spindle journaled in said work support,
(i) means for securing a workpiece to said work spindle to rotate therewith,
(j) means for selectively rotating one of said spindles,
(k) means for locking said work spindle against rotation,
(l) and means interlocking the means for moving said tool spindle axially and the means for moving said mounting means so that said first tool cannot be advanced when said second tool is advanced, and vice versa.

8. A machine tool comprising
(a) a tool support,
(b) a tool spindle journaled in said tool support,
(c) means for securing a first tool to said tool spindle to rotate therewith,
(d) means for securing a second tool on said tool support in offset relation to said tool spindle and against rotation relative to said tool support,
(e) means for moving said tool spindle axially in opposite directions to advance and retract the tool secured thereto,
(f) a work support,
(g) a work spindle journaled in said work support,
(h) means for securing a workpiece to said work spindle,
(i) means for selectively rotating one of said spindles,
(j) means for moving said tool support selectively axially of said tool spindle, vertically and horizontally at right angles to said tool spindle to effect feed of the tools relative to the workpiece in three directions.

9. A machine tool according to claim 8, having
(a) means for mounting a third tool non-rotatably on said tool support,
(b) means for moving said mounting means in opposite directions parallel to the axis of said tool spindle to advance and retract said third tool, and (c) means for interlocking said mounting means and said means for moving the tool spindle so that said first tool cannot be advanced when said third tool is advanced, and vice versa.

10. A machine tool comprising
(a) a tool support,
(b) a tool spindle journaled in said tool support,
(c) means for securing a first tool to said tool spindle to rotate therewith,
(d) means for securing a second tool on said tool support in offset relation to said tool spindle and against rotation relative to said tool support,
(e) a work support having four sides,
(f) a pair of work spindles journaled in said work support in offset parallel relation and projecting at their opposite ends respectively beyond two sides of the work support,
(g) means for securing workpieces to said work spindles to rotate therewith,
(h) means for fixedly securing workpieces to the other two sides of the work support,
(i) means for rotatably indexing said work support about an axis extending at right angles to the axes of said work spindles to bring the workpieces selectively into operative relation with the tools, and
(j) means for moving the tool support horizontally at right angles to the tool spindle, vertically, and axially of the tool spindle.

11. A machine tool comprising
(a) a tool support,
(b) a tool spindle journaled in said tool support,
(c) means for securing a first tool to said tool spindle to rotate therewith,
(d) means for non-rotatably mounting a second tool on said tool support,
(e) means for moving said mounting means in opposite directions parallel to the axis of said tool spindle to advance and retract said second tool,
(f) means for moving said tool spindle axially in opposite directions to advance and retract said first tool,
(g) a third tool secured to said tool support in fixed, offset relation to said first and second tools,
(h) a rotary table,
(i) a work support mounted thereon,
(j) a work spindle journaled in said work support,
(k) means for rotating said table about an axis extending at right angles to the axis of work spindle,
(l) means for adjusting said tool support axially of said tool spindle, horizontally at right angles to the axis of said tool spindle, and vertically,
(m) and means for selectively rotating the two spindles.

12. A machine tool comprising
(a) a tool support,
(b) a tool spindle journaled in said tool support,
(c) means for securing a drill, tap, end mill, boring tool, and milling cutter selectively to said tool spindle to rotate therewith,
(d) means for non-rotatably mounting a boring tool on said tool support,
(e) means for moving said tool spindle axially in opposite direction, to advance and retract the tool secured thereto,
(f) means for moving said mounting means in opposite directions parallel to the axis of said tool spindle to advance and retract the boring tool secured thereto,
(g) a turning tool fixedly secured to said tool support,
(h) a work support,
(i) a work spindle journaled in said work support,
(j) means for securing a workpiece to said work spindle,
(k) means for adjusting said work support angularly about an axis extending at right angles to the axis of said work spindle,
(l) means for selectively rotating the two spindles, and
(m) means for adjusting and feeding said tool support axially of said tool spindle, vertically, and horizontally in a direction at right angles to the axis of said tool spindle to effect various machining operations with the several tools in a predetermined sequence on a workpiece secured to said work spindle.

13. A machine tool comprising
   (a) a tool support,
   (b) a tool spindle journaled in said tool support,
   (c) means for securing a drill, tap, end mill, boring tool, and milling cutter selectively to said tool spindle to rotate therewith,
   (d) means for non-rotatably mounting a boring tool on said tool support,
   (e) means for moving said tool spindle axially in opposite directions to advance and retract the tool secured thereto,
   (f) means for moving said mounting means in opposite directions parallel to the axis of said tool spindle to advance and retract the boring tool secured thereto,
   (g) a turning tool fixedly secured to said tool support in offset relation to both said tool spindle and said mounting means,
   (h) a work support,
   (i) a work spindle journaled in said work support,
   (j) means for securing a workpiece to said work spindle,
   (k) means for fixedly securing a workpiece to said work support,
   (l) means for rotating both said spindles,
   (m) means for locking said work spindle against rotation,
   (n) means for adjusting said work support about an axis extending at right angles to the axis of said work spindle to bring the workpieces selectively into operating position,
   (o) means for adjusting and feeding said tool support axially of said tool spindle, vertically, and horizontally in a direction at right angles to the axis of said tool spindle, and for adjusting said work support, and locking up said work spindle to effect various machining operations with the several tools on the workpieces in a predetermined sequence.

14. A machine tool comprising
   (a) a tool support,
   (b) a plurality of tools fixedly secured to said tool support in offset relation to one another,
   (c) a work support,
   (d) a work spindle journaled in said work support,
   (e) means for securing a workpiece to said work spindle,
   (f) means for rotating said work spindle, and
   (g) means for adjusting and moving said tool support rectilinearly to adjust said tools into operative relation with the workpiece and to effect machining operations thereon in a predetermined sequence.

15. A machine tool according to claim 14, wherein
   (a) one of the tools is a boring tool, and
   (b) means is provided for advancing said boring tool to operative position and for retracting said boring tool therefrom.

16. A machine tool as claimed in claim 14, wherein the means for adjusting and moving said tool support selectively effects movement of the tool support in three directions rectilinearly at right angles respectively to one another.

17. In a machine tool,
   (a) a bed,
   (b) a column reciprocable horizontally and rectilinearly on said bed,
   (c) a slide reciprocable rectilinearly vertically on said column,
   (d) a head reciprocable rectilinearly on said slide in a direction at right angles to the directions of reciprocation of both said column and said slide,
   (e) a tool spindle journaled in said head with its axis extending in the direction of adjustment of said head, said tool spindle being adapted to have a milling cutter, a boring tool, a drill, a tap, and an end mill secured selectively thereto to rotate therewith,
   (f) means for mounting a boring bar on said tool head in parallel, offset relation to said tool spindle,
   (g) means for fixedly securing a turning tool to said tool head in offset relation to said boring bar and said tool spindle and to project laterally from said tool head,
   (h) a table rotatably mounted on said bed,
   (i) a four-sided work head mounted on said table,
   (j) a pair of work spindles journaled in said work head in parallelism and projecting at opposite ends from two of the sides of said work head, the axes of said work spindles extending at right angles to the axis of said table,
   (k) means for securing workpieces to the projecting ends of said work spindles,
   (l) means for securing workpieces fixedly to the other two sides of the work head,
   (m) means for rotating the tool spindle,
   (n) means for rotating the work spindles,
   (o) means for locking the work spindles against rotation,
   (p) means for rotatably indexing the work table about its axis,
   (q) means for locking the work table in any indexed position, and
   (r) means for effecting adjustment and movement of the column, slide, and tool head in the above-recited directions.

18. A machine tool according to claim 17, wherein
   (a) there is a drawbar mounted in said tool spindle for releasably securing the selected tool to said tool spindle,
   (b) means is provided for moving the drawbar back and forward selectively to clamp and release, respectively, a tool,
   (c) means is provided for moving the tool spindle axially forward and back to advance and retract, respectively, a tool secured thereto,
   (d) means is provided for effecting rectilinear reciprocable movement of said boring tool mounting means in said tool head in a direction parallel to the axis of said tool spindle to advance and retract the boring tool mounted thereon,
   (e) means is provided for effecting the described movements of the column, slide, tool head, tool spindle, boring bar mounting means, drawbar, table and work spindle selectively in a predetermined sequence to effect desired machining operation on the workpieces.

19. A machine tool according to claim 18, wherein the tool spindle is advanced axially selectively to different positions determined by different stop means, said stop means including a plurality of limit switches.

20. A machine tool according to claim 18, wherein
   (a) a tool changer is provided for carrying a plurality of tools,
   (b) said tool changer is mounted on said tool head for step-by-step adjustment about an axis offset from and parallel to the axis of said tool spindle, and
   (c) means is provided for indexing said tool changer in predetermined sequence with the other operations of the machine to bring the different tools carried thereby into registry with the tool spindle.

References Cited by the Examiner
UNITED STATES PATENTS

| | | | |
|---|---|---|---|
| 2,671,233 | 3/1954 | Marchant et al. | 10—128 |
| 3,003,165 | 10/1961 | Charlat | 10—128 |
| 3,052,011 | 9/1962 | Brainard et al. | 29—26 |

ANDREW R. JUHASZ, *Primary Examiner.*